(12) United States Patent
You et al.

(10) Patent No.: US 12,140,772 B2
(45) Date of Patent: Nov. 12, 2024

(54) MULTI-DOF MOVING STAGE AND DISPLAY APPARATUS USING THE SAME

(71) Applicants: SAMSUNG ELECTRONICS CO., LTD., Suwon-si (KR); SEOUL NATIONAL UNIVERSITY R&DB FOUNDATION, Seoul (KR); AJOU UNIVERSITY INDUSTRY-ACADEMIC COOPERATION FOUNDATION, Suwon-si (KR)

(72) Inventors: Jangwoo You, Suwon-si (KR); Yongmin Park, Seoul (KR); Jesung Koh, Suwon-si (KR); Changkun Lee, Suwon-si (KR); Sunpil Jeong, Suwon-si (KR); Kyujin Cho, Seoul (KR)

(73) Assignees: SAMSUNG ELECTRONICS CO., LTD., Suwon-si (KR); SEOUL NATIONAL UNIVERSITY R&DB FOUNDATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 30 days.

(21) Appl. No.: 18/209,627

(22) Filed: Jun. 14, 2023

(65) Prior Publication Data
US 2023/0400698 A1    Dec. 14, 2023

(30) Foreign Application Priority Data

Jun. 14, 2022 (KR) .................. 10-2022-0072430

(51) Int. Cl.
*G02B 27/01* (2006.01)
*G02B 27/00* (2006.01)
(Continued)

(52) U.S. Cl.
CPC ..... *G02B 27/0179* (2013.01); *G02B 27/0149* (2013.01); *G02B 27/0172* (2013.01);
(Continued)

(58) Field of Classification Search
CPC ............ G02B 27/0179; G02B 27/0149; G02B 27/0172; G02B 27/0176; G02B 27/0093;
(Continued)

(56) References Cited

U.S. PATENT DOCUMENTS

| 7,367,772 B2* | 5/2008 | Khajepour | ............. B25J 9/0078 |
| | | | 414/735 |
| 8,307,732 B2* | 11/2012 | Kinoshita | ............. B25J 17/0266 |
| | | | 901/19 |

(Continued)

FOREIGN PATENT DOCUMENTS

| JP | 8-42132 A | 2/1996 |
| KR | 10-1688876 B1 | 12/2016 |
| KR | 10-1733572 B1 | 5/2017 |

*Primary Examiner* — Michael Pervan
(74) *Attorney, Agent, or Firm* — Sughrue Mion, PLLC

(57) ABSTRACT

A multi-degree of freedom (DOF) moving stage includes a plurality of joint portions. At least one of the plurality of joint portions has a joint structure including a first flexible member and first and second rigid members, the first and second rigid members being arranged apart from each other with a first gap therebetween such that the first gap exposes a first surface of the first flexible member. Castellated patterns having shapes complementary to each other are respectively provided at a first end portion of the first rigid member adjacent to the first gap and a second end portion of the second rigid member adjacent to the first gap.

20 Claims, 14 Drawing Sheets

(51) Int. Cl.
*G02B 30/20* (2020.01)
*G02B 30/33* (2020.01)

(52) U.S. Cl.
CPC ......... *G02B 27/0176* (2013.01); *G02B 30/20* (2020.01); *G02B 30/33* (2020.01); *G02B 27/0093* (2013.01); *G02B 2027/0134* (2013.01); *G02B 2027/0159* (2013.01); *G02B 2027/0187* (2013.01)

(58) Field of Classification Search
CPC .... G02B 2027/0134; G02B 2027/0159; G02B 2027/0187; G02B 30/33; G02B 30/20
See application file for complete search history.

(56) References Cited

U.S. PATENT DOCUMENTS

| | | | |
|---|---|---|---|
| 8,573,889 B2 | 11/2013 | Bauer | |
| 2007/0113700 A1* | 5/2007 | Khajepour | B25J 9/0078 |
| | | | 414/735 |
| 2011/0097184 A1* | 4/2011 | Kinoshita | B25J 17/0266 |
| | | | 414/589 |
| 2013/0079930 A1* | 3/2013 | Mistry | B25J 9/1643 |
| | | | 901/15 |
| 2022/0283435 A1 | 9/2022 | You et al. | |
| 2024/0066689 A1* | 2/2024 | Moghadam | B25J 9/1075 |

* cited by examiner

MULTI-DOF MOVING STAGE AND DISPLAY APPARATUS USING THE SAME

CROSS-REFERENCE TO RELATED APPLICATION

This application claims the benefit of Korean Patent Application No. 10-2022-0072430, filed on Jun. 14, 2022, in the Korean Intellectual Property Office, the disclosure of which is incorporated by reference herein in its entirety.

BACKGROUND

1. Field

The disclosure relates to a multi-degree of freedom (DOF) moving stage for adjusting the position of a light source, and a display apparatus using the multi-DOF moving stage.

2. Description of Related Art

Holographic technology is used to realize a three-dimensional (3D) stereoscopic image by reproducing the phase and amplitude of an object wave of an object to be regenerated. It is possible to match a convergence position to a focal position by using the technology, so that a user may obtain a real and natural image as felt in reality.

For 3D glasses or a virtual reality device used to realize a stereoscopic image, a stereoscopic image is realized by providing different images to both eyes. However, as the image is output from a flat panel, actually, the location where pupil directions of the eyes converge on an object (the location of a display that outputs an image) may not match the location of a focus tuned by adjusting the thickness of the eye lens (the location of a realized image that a user feels), and thus, the eyes may feel fatigue.

In contrast, using holographic technology, the convergence location may match the focus location. Thus, the user may obtain an image that is real and natural as felt in real life. According to the technology, a computer generated hologram (CGH), that is, a hologram image realized by a computer, is incident on a spatial light modulator (SLM), and thus, a 3D stereoscopic image may be provided to a user.

SUMMARY

There is a correlation between the pixel size of a spatial light modulator and a viewing angle to view an image. As the size of a pixel decreases, more diffraction of light occurs so that a viewing angle to view an image increases. However, the viewing angle also has a limitation due to the physical limitation of the pixel size. A method of increasing a viewing angle by moving a holographic display system depending on the observation position of a user may be considered. In this case, however, the whole system is moved, and thus, it may be difficult to follow quickly in real time the movement of a user.

Provided is a multi-degree of freedom (DOF) moving stage which may adjust the position of a light source in response to the movements of binocular pupils of a user.

Provided is a multi-DOF moving stage with improved rigidity which may adjust the position of a light source in response to the movements of binocular pupils of a user.

Provided is a multi-DOF moving stage which may adjust the position of a light source at a high speed in response to the movements of binocular pupils of a user.

Provided is a multi-DOF moving stage which may adjust the position of a light source precisely in response to the movements of binocular pupils of a user.

Provided is a display apparatus which may provide a virtual image adopting the multi-DOF moving stage described above.

Additional aspects will be set forth in part in the description which follows and, in part, will be apparent from the description, or may be learned by practice of the presented embodiments.

In accordance with an aspect of the disclosure, a multi-degree of freedom (DOF) moving stage includes an end-effector; a plurality of driving links; a plurality of actuators configured to drive the plurality of driving links; and a plurality of driven links each including a first joint portion connected to the end-effector and a second joint portion connected to a respective one of the plurality of driving links, wherein for each of the plurality of driven links, at least one of the first joint portion and the second joint portion includes a joint structure comprising a first flexible member, a first rigid member, and a second rigid member, wherein the first rigid member and the second rigid member are arranged apart from each other such that a first gap between the first rigid member and the second rigid member exposes a first surface of the first flexible member, and wherein castellated patterns having shapes complementary to each other are respectively provided at a first end portion of the first rigid member adjacent to the first gap and a second end portion of the second rigid member adjacent to the first gap.

The joint structure may include a third rigid member and a fourth rigid member arranged apart from each other with a second gap therebetween such that the second gap exposes a second surface of the first flexible member, the third rigid member and the fourth rigid member respectively facing the first rigid member and the second rigid member.

Castellated patterns having shapes complementary to each other may be respectively provided at a third end portion of the third rigid member adjacent to the second gap and a fourth end portion of the fourth rigid member adjacent to the second gap.

The joint structure may include a second flexible member on the first rigid member and on the second rigid member; and a fifth rigid member and a sixth rigid member arranged apart from each other with a third gap therebetween such that the third gap exposes the second flexible member, the fifth rigid member and the sixth rigid member respectively facing the first rigid member and the second rigid member, the third gap being larger than the first gap, wherein a first recess portion is provided in the first rigid member and a second recess portion is provided in the second rigid member to correspond to the third gap, and wherein two or more rigid segment members are arranged at a position corresponding to the third gap and wherein at least one fourth gap is provided between adjacent rigid segment members of the two or more rigid segment members such that the at least one fourth gap exposes at least one surface of the second flexible member.

Castellated patterns having shapes complementary to each other may be provided at a fifth end portion and a sixth end portion of the fifth rigid member and the sixth rigid member, respectively, adjacent to the third gap and to end portions of the two or more rigid segment members.

The plurality of actuators may drive the plurality of driving links to rotate.

Each of the plurality of driven links may include a first arm, a second arm, a third arm, and a fourth arm connected in a form of a parallelogram by a third joint portion, and the third joint portion may include another of the joint structure.

At least one from among the first arm, the second arm, the third arm, and the fourth arm may have a bent hollow prism shape.

The plurality of actuators may drive the plurality of driving links to translate, wherein the plurality of actuators are connected to the plurality of driving links via a fourth joint portion, and wherein the fourth joint portion includes another of the joint structure.

In accordance with an aspect of the disclosure, a display apparatus includes a light source configured to provide image light; a multi-degree of freedom (DOF) moving stage configured to adjust a position of the light source; and an optical system configured to provide the image light to a pupil, wherein the multi-DOF moving stage includes an end-effector on which the light source is mounted; a plurality of driving links; a plurality of actuators configured to drive the plurality of driving links; and a plurality of driven links each including a first joint portion connected to the end-effector and a second joint portion connected to a respective one of the plurality of driving links, wherein for each of the plurality of driven links, at least one of the first joint portion and the second joint portion includes a joint structure comprising a first flexible member, a first rigid member, and a second rigid member, wherein the first rigid member and the second rigid member are arranged apart from each other such that a first gap between the first rigid member and the second rigid member exposes a first surface of the first flexible member, and wherein castellated patterns having shapes complementary to each other are respectively provided at a first end portion of the first rigid member adjacent to the first gap and a second end portion of the second rigid member adjacent to the first gap.

The joint structure may include a third rigid member and a fourth rigid member arranged apart from each other with a second gap therebetween such that the second gap exposes a second surface of the first flexible member, the third rigid member and the fourth rigid member respectively facing the first rigid member and the second rigid member.

Castellated patterns having shapes complementary to each other may be respectively provided at a third end portion of the third rigid member adjacent to the second gap and a fourth end portion of the fourth rigid member adjacent to the second gap.

The joint structure may include a second flexible member on the first rigid member and on the second rigid member; and a fifth rigid member and a sixth rigid member arranged apart from each other with a third gap therebetween such that the third gap exposes the second flexible member, the fifth rigid member and the sixth rigid member respectively facing the first rigid member and the second rigid member, the third gap being larger than the first gap, wherein a first recess portion is provided in the first rigid member and a second recess portion is provided in the second rigid member to correspond to the third gap, wherein two or more rigid segment members are arranged at a position corresponding to the third gap, and wherein at least one fourth gap is provided between adjacent rigid segment members of the two or more rigid segment members such that the at least one fourth gap exposes at least one surface of the second flexible member.

Castellated patterns having shapes complementary to each other may be provided at a fifth end portion and a sixth end portion of the fifth rigid member and the sixth rigid member, respectively, adjacent to the third gap and to end portions of the two or more rigid segment members.

The plurality of actuators may drive the plurality of driving links to rotate.

Each of the plurality of driven links may include a first arm, a second arm, a third arm, and a fourth arm connected in a form of a parallelogram by a third joint portion, and the third joint portion may include another of the joint structure.

At least one from among the first arm, the second arm, the third arm, and the fourth arm may have a bent hollow prism shape.

The plurality of actuators may drive the plurality of driving links to translate, wherein the plurality of actuators may be connected to the plurality of driving links via a fourth joint portion, and wherein the fourth joint portion may include another of the joint structure.

The plurality of driving links may include three driving links, the plurality of driven links may include three driven links, and the plurality of actuators may include three actuators.

The light source may include a first light source and a second light source configured to provide a left-eye image and a right-eye image, respectively, and the multi-DOF moving stage may include a first multi-DOF moving stage and a second multi-DOF moving stage corresponding to the first light source and the second light source, respectively.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
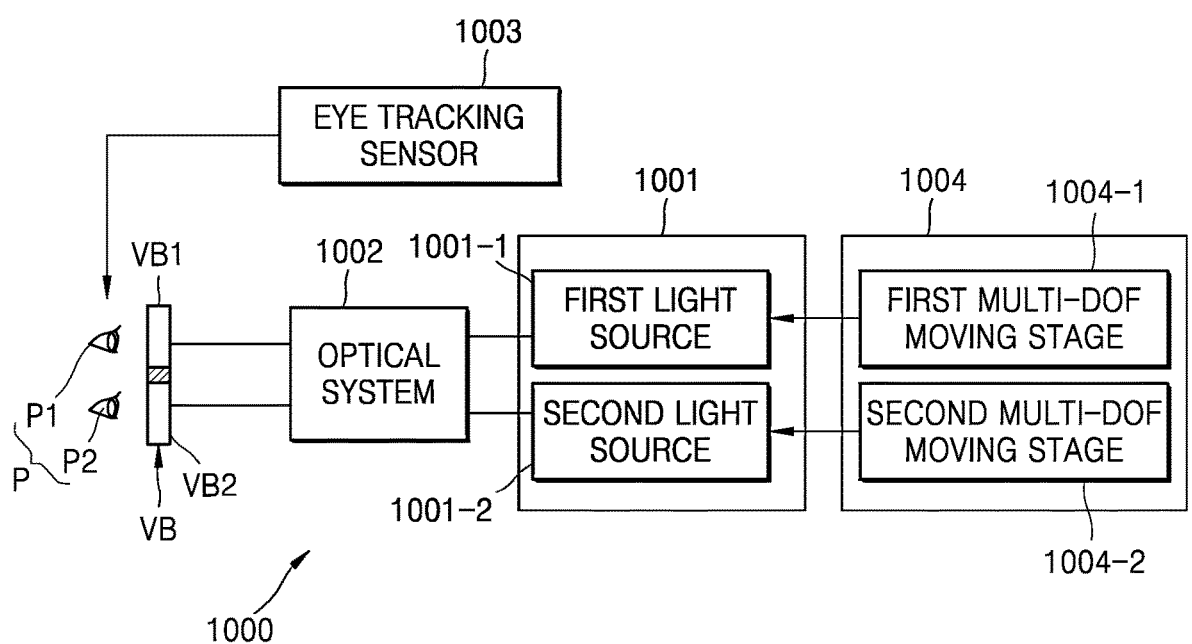
FIG. 1 is a schematic block diagram of a configuration of a display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a multi-degree of freedom (DOF) moving stage according to an embodiment and a display apparatus will be described in detail by explaining embodiments of the disclosure with reference to the attached drawings. In the accompanying drawings, like reference numerals refer to like elements throughout, and the thickness or size of each layer illustrated in the drawings may be exaggerated for convenience of explanation and clarity. Furthermore, as embodiments described below are examples, other modifications may be produced from the embodiments.

In a layer structure, when a constituent element is disposed "above" or "on" to another constituent element, the constituent element may be only directly on the other constituent element or above the other constituent elements in a non-contact manner. The expression of singularity in the specification includes the expression of plurality unless clearly specified otherwise in context. It will be further understood that the terms "comprises" and/or "comprising" used herein specify the presence of stated features or components, but do not preclude the presence or addition of one or more other features or components.

The use of the terms "a" and "an" and "the" and similar referents in the context of describing the disclosure are to be construed to cover both the singular and the plural. Also, the steps of all methods described herein can be performed in any suitable order unless otherwise indicated herein or otherwise clearly contradicted by context. The disclosure is not limited to the described order of the steps.

It will be understood that although the terms "first," "second," etc. may be used herein to describe various components, these components should not be limited by these terms. The terms are used only to distinguish one component from another.

FIG. 1 is a schematic block diagram of a configuration of a display apparatus 1000 according to an embodiment. Referring to FIG. 1, the display apparatus 1000 may include a light source 1001 for providing image light, and an optical system 1002 for providing the image light to pupils P of an observer. The light source 1001 may include a first light source 1001-1 and a second light source 1001-2. The first light source 1001-1 provides, for example, image light for the left eye. The second light source 1001-2 provides, for example, image light for the right eye. The first light source 1001-1 and the second light source 1001-2 may each include an image generation unit for providing image light. The first light source 1001-1 and the second light source 1001-2 may be, for example, compact projectors. The first light source 1001-1 and the second light source 1001-2 may be, for example, light sources for providing light that is not modulated into image light. The optical system 1002 may include a first optical system and a second optical system for providing the image light for the left eye and the image light for the right eye respectively to a left pupil P1 and a right pupil P2 of the observer.

The first and second light sources 1001-1 and 1001-2 may each include a display panel for generating light including image information and an optical system for diffusing the light from the display panel. The first and second light sources 1001-1 and 1001-2 may emit the image light for the left eye and the image light for the right eye, respectively. Accordingly, a three-dimensional (3D) stereoscopic image obtained by combining an image for the left eye with an image for the right eye may be provided to the observer. The first and second light sources 1001-1 and 1001-2 may each generate a computer generated hologram (CGH) image. For example, the first and second light sources 1001-1 and 1001-2 may each include a display panel for generating a CGH image. Changes in the positions of the left and right pupils P1 and P2 of the observer are detected by an eye tracking sensor 1003. A controller calculates the amounts of position adjustment of the first and second light sources 1001-1 and 1001-2, based on the changes in the positions of the left and right pupils P1 and P2, and drives first and second multi-DOF moving stages 1004-1 and 1004-2 of moving stage 1004 based on the calculated adjustment amount. Accordingly, even when the positions of the left and right pupils P1 and P2 of the observer are changed, the image light from the first and second light sources 1001-1 and 1001-2 may be delivered to the left and right pupils P1 and P2 at the changed positions.

The optical system 1002 has a structure to allow the left-eye image and the right-eye image from the first and second light sources 1001-1 and 1001-2 to be respectively incident on the left and right pupils P1 and P2 of a user. For example, the optical system 1002 may include a spatial light modulator for providing a user with a 3D stereoscopic image.

The display apparatus 1000 may include, for example, a head-up display for a vehicle, a holographic 3D display, a two-dimensional (2D) stereo display, and the like. For example, a head-up display for a vehicle is technology which enables a driver to see various pieces of information about a vehicle by providing the information on the windshield of a vehicle. Accordingly, the driver may obtain various pieces of information necessary for driving while looking forward in the direction of driving. According to the related art, as graphics in a flat form formed on the display panel are projected onto the windshield, the driver may obtain only simple screen information without a 3D effect, which is far from the actual road ahead without a sense of unity. As a method of delivering various and intuitive pieces of information about an actual road with a sense of unity, research is underway to apply holography technology to give a driver a 3D effect of visual information to a head-up display for a vehicle. The holography technology provides visual information having a 3D effect by accurately matching two different light sources with the pupils P of a driver so as to differentiate between visual information for the left and right pupils P1 and P2. However, the positions of the pupils P are not always the same according to the movement of a driver, and the position of the pupils P may change quickly according to the situation. In this state, when a light source does not follow the pupils P of a driver so as to accurately correspond to the position of the pupils P, the driver may receive information having a distorted 3D effect or may not receive information at all. Accordingly, to implement the holography technology, the position of a light source needs to be rapidly and accurately adjusted corresponding to the position of the pupils P within a range (view box VB) in which the pupils P of a driver are expected to be located.

To this end, the display apparatus 1000 may include the eye tracking sensor 1003 and a multi-DOF moving stage 1004 for adjusting the position of the light source 1001. The eye tracking sensor 1003 may track the movement of the pupils P to transmit information about the position of the pupils P to the controller, and the controller may drive the multi-DOF moving stage 1004 based on the information about the position of the pupils P to adjust the position of the light source 1001 so that image light is transmitted to the pupils P. The multi-DOF moving stage 1004 may include the first multi-DOF moving stage 1004-1 and the second multi-DOF moving stage 1004-2 respectively corresponding to the first light source 1001-1 and the second light source 1001-2. In the display apparatus 1000, a range in which the pupils P are expected to be located, for example, the view box VB, is the sum of a range VB1 in which the left pupil P1 is to be located and a range VB2 in which the right pupil P2 is to be located. Considering an average distance between the left pupil P1 and the right pupil P2 and a vertical movement distance of a pupil, the view box VB may be about 30 mm in the horizontal direction, about 15 mm in the vertical direction, and about 15 mm in depth.

In addition to the requirements of the speed and precision of holography technology, the multi-DOF moving stage 1004 needs to be miniaturized to be applied in the field of applications, such as a head-up display for a vehicle and the like, with a limitation in space. As the head-up display for a vehicle projects an image reflected from the windshield of a vehicle to proceed toward the pupils P of a driver, the light source 1001 and the multi-DOF moving stage 1004 are arranged in a limited space below the windshield. To implement a compact system, the two independent multi-DOF moving stages, that is, the first multi-DOF moving stage 1004-1 and the second multi-DOF moving stage 1004-2, need to be arranged densely in parallel, and thus, the miniaturization of the multi-DOF moving stage 1004 is necessary.

As a known multi-DOF driving mechanism, there are various mechanisms including a parallel robot mechanism, such as a delta robot, a hexapod, a tripteron, and the like, a serial robot mechanism, such as a robot arm, a selective compliance assembly robot arm or selective compliance articulated robot arm (SCARA), and the like. The parallel robot mechanism is a structure in which a driving unit is separated from a moving unit so that a high-speed movement of the moving unit is possible due to small inertia of the moving unit. Also, as the moving unit is supported by a plurality of linkages, the parallel robot mechanism has high rigidity and a large portable load for the weight of a robot. Furthermore, the parallel robot mechanism, unlike a serial robot mechanism, has high precision because errors of a driving unit do not accumulate and the static and dynamic deformation of linkages is relatively small.

The movement of a light source for expanding a viewing angle of a holographic display requires high-speed position control, high-precision control, and high rigidity of a driving mechanism. In this point of view, as a multi-DOF driving mechanism for adjusting the position of a light source, the parallel robot mechanism is appropriate structurally and mechanically. The multi-DOF moving stage 1004 according to an embodiment is a parallel robot-type moving stage capable of producing fast, accurate, and repetitive movements. The multi-DOF moving stage 1004 may include the first and second multi-DOF moving stages 1004-1 and 1004-2. As the first and second multi-DOF moving stages 1004-1 and 1004-2 have the same configuration, the first multi-DOF moving stage 1004-1 is mainly described below.

Figure 2:
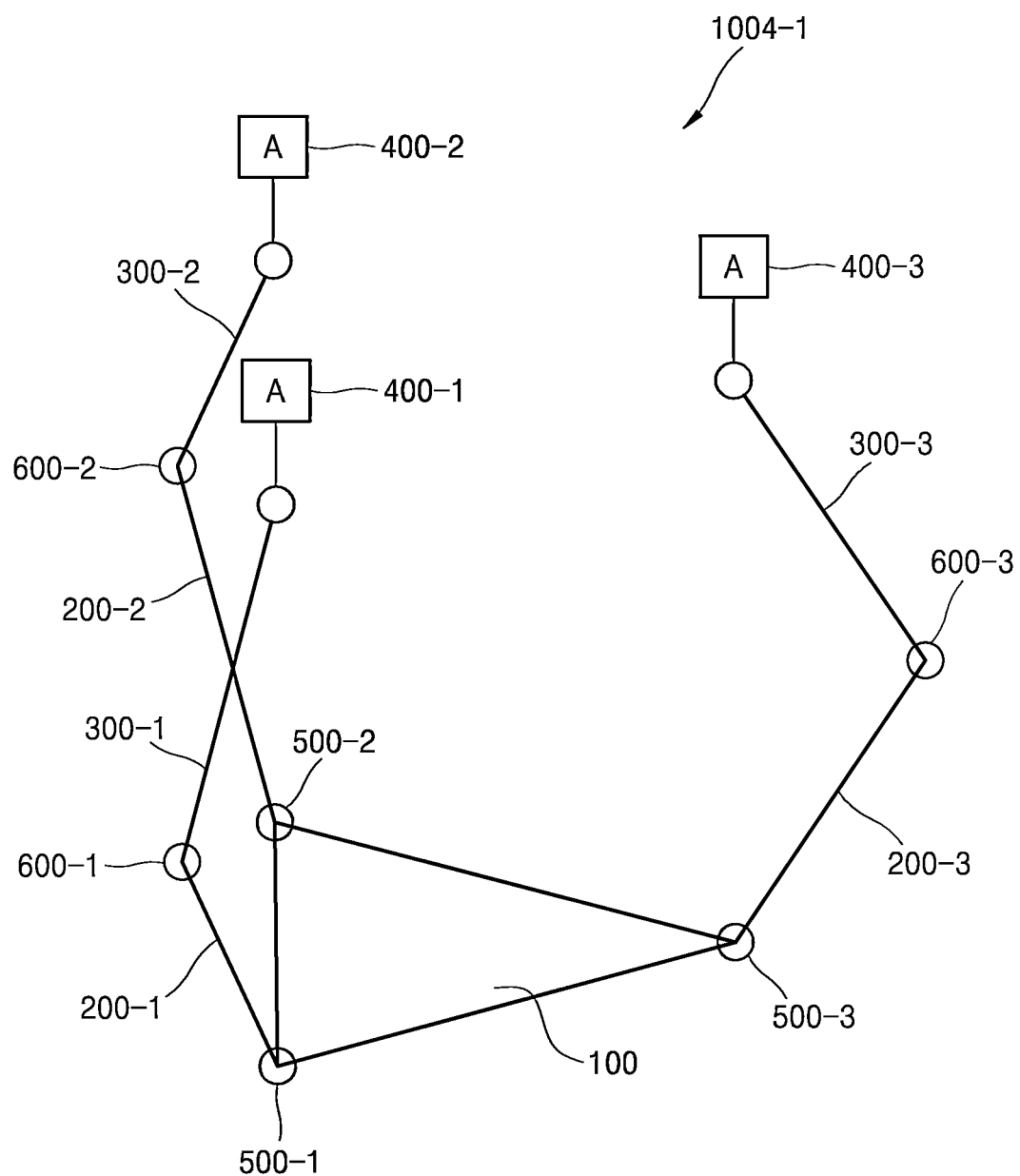
FIG. 2 is a schematic block diagram of a configuration of a delta robot type multi-degree of freedom (DOF) moving stage according to an embodiment.

FIG. 2 is a schematic block diagram of a configuration of the multi-DOF moving stage 1004-1 of a delta robot type, according to an embodiment. Referring to FIG. 2, the multi-DOF moving stage 1004-1 may include an end-effector 100 and a plurality of, for example, three actuators 400-1, 400-2, and 400-3. The end-effector 100 may be connected to the actuators 400-1, 400-2, and 400-3 by driving transfer elements. The driving transfer elements may include a plurality of joint portions. At least one of the joint portions may have a joint structure 2000 shown in FIGS. 3 to 9 described below. As an example, the driving transfer element may include a plurality of, for example, three, driving links 300-1, 300-2, and 300-3, and a plurality of, for example, three, driven links 200-1, 200-2, and 200-3.

A light source, for example, the first light source 1001-1, is mounted on the end-effector 100. The three actuators 400-1, 400-2, and 400-3 drive the three driving links 300-1, 300-2, and 300-3, respectively. The three driven links 200-1, 200-2, and 200-3 respectively connect the end-effector 100 to the three driving links 300-1, 300-2, and 300-3. The three driven links 200-1, 200-2, and 200-3 respectively include first joint portions 500-1, 500-2, and 500-3 connected to the end-effector 100, and the second joint portions 600-1, 600-2, and 600-3 respectively connected to the three driving links 300-1, 300-2, and 300-3. The first joint portions 500-1, 500-2, and 500-3 and the second joint portions 600-1, 600-2, and 600-3 may be 1-axis rotary joint portions. At least one of the first joint portions 500-1, 500-2, and 500-3 and the second joint portions 600-1, 600-2, and 600-3 may have the joint structure 2000 shown in FIGS. 3 to 9 described below. In an embodiment, the three driven links 200-1, 200-2, and 200-3 are connected to the end-effector 100 at equal intervals of, for example, 120°.

The joint portion of the parallel robot mechanism is generally implemented by commercial precision components, such as a ball joint, a universal joint, and the like. In this case, there is a limitation in miniaturization and productivity due to a restriction in the minimum size of components constituting the joint portion, and the complexity of assembly. In an embodiment, the first joint portions 500-1, 500-2, and 500-3 and the second joint portions 600-1, 600-2, and 600-3 each have a structure of using bending of a flexible member exposed between two panel-shaped rigid members having relatively rigidity that are stacked, for example, bonded, on the flexible member.

For example, the first joint portions 500-1, 500-2, and 500-3 and the second joint portions 600-1, 600-2, and 600-3 may be manufactured by a stack manufacturing method using a 2D-based origami mechanism. According to the 2D-based origami mechanism, a panel-shaped solid material forming a linkage and a panel-shaped flexible material forming a joint are stacked and bonded to each other, and a portion of the panel-shaped solid material is incised to form a hinge, thereby implementing a linkage-joint integrated structure. According to the 2D-based origami mechanism, as a linkage-joint structure may be formed without a complex process for assembling axes, bearings, and the like, a manufacturing process is simplified, and thus, the miniaturization of a moving stage mechanism is possible. Furthermore, according to the 2D-based origami mechanism, as a thin and light material is used, a light linkage may be formed, and thus, the inertia of the moving unit may be reduced and a high speed movement of the moving unit is possible. Embodiments of the joint structure 2000 applied to the first joint portions 500-1, 500-2, and 500-3 and the second joint portions 600-1, 600-2, and 600-3 are described below.

Figure 3:
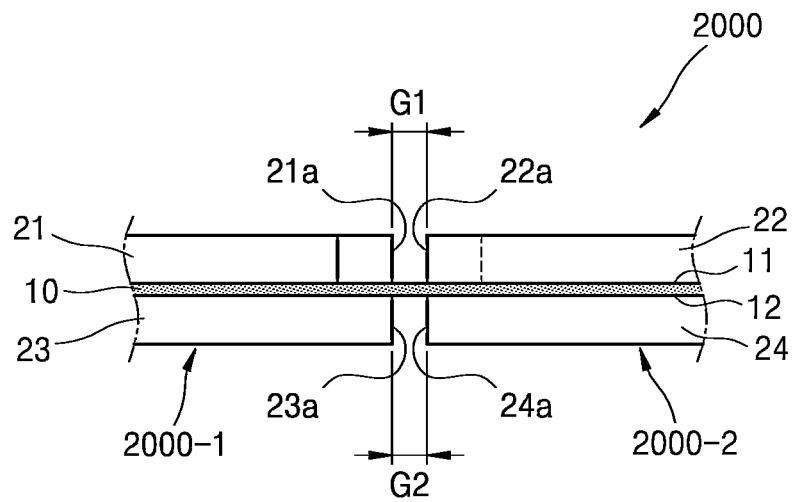
FIG. 3 is a schematic cross-sectional view of a joint portion according to an embodiment.
Figure 4:
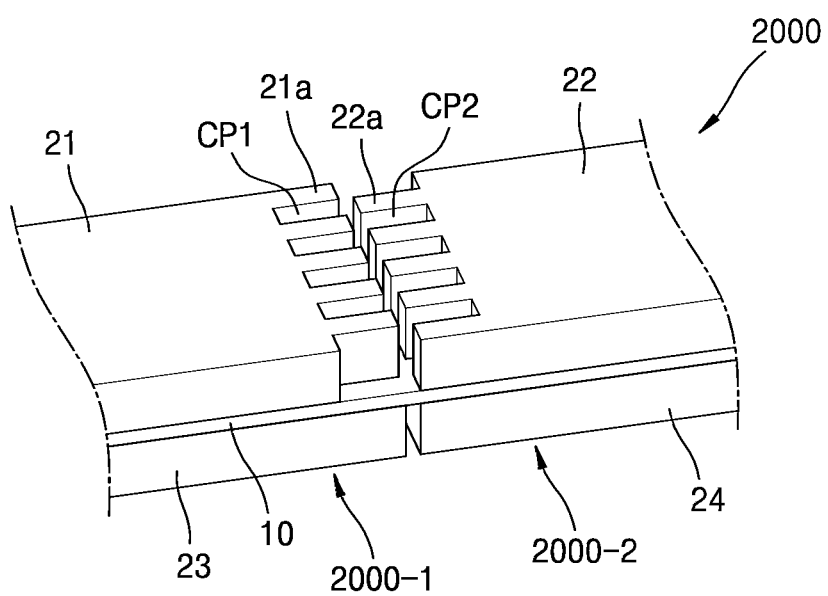
FIG. 4 is a schematic perspective view of the joint portion of FIG. 3.

FIG. 3 is a schematic cross-sectional view of the joint structure 2000 according to an embodiment. FIG. 4 is a schematic perspective view of the joint structure 2000 of FIG. 3, according to an embodiment. Referring to FIGS. 3 and 4, the joint structure 2000 may include a first flexible member 10 and first and second rigid members 21 and 22. The first and second rigid members 21 and 22 are arranged apart from each other with a first gap G1 therebetween on a first surface 11 of the first flexible member 10 such that the first gap exposes the first surface 11 of the first flexible member 10. For example, the first and second rigid members 21 and 22 may be bonded to the first surface 11 of the first flexible member 10 via an adhesive layer. The first flexible member 10 may be formed of a flexible material, such as a film, textile, and the like. The first flexible member 10 may be elastic. For example, the first flexible member 10 may be in the form of a flexible material, such as textile and the like, and an elastic member, such as a polymer material and the like, stacked on or combined with each other. The first and second rigid members 21 and 22 may be panel-shaped members with relative rigidity, such as a polymer film, compressed paper, and the like. As an example, a panel-shaped rigid member is bonded to the first surface 11 of the first flexible member 10, and a portion corresponding to the first gap G1 is incised by using laser and the like, thereby implementing the first and second rigid members 21 and 22 that are arranged apart from each other with the first gap G1 therebetween. Accordingly, the joint structure 2000 may be implemented where a first link 2000-1 including the first rigid member 21 and a second link 2000-2 including the second rigid member 22 are rotatably connected to each other by using, as a hinge, the first flexible member 10 that is flexible and exposed through the first gap G1.

For example, when the second link 2000-2 rotates with respect to the first link 2000-1, the first flexible member 10 functions as a hinge of a rotational motion in the first gap G1. As the first flexible member 10 has relatively small rigidity, the positional instability of the hinge increases as the first gap G1 increases. Accordingly, there is a need to decrease the first gap G1 as much as possible. To prevent first and second end portions 21a and 22a of the first and second rigid members 21 and 22 adjacent to the first gap G1 from interfering with each other, the first gap G1 needs to be greater than the thickness of at least the first and second rigid members 21 and 22. Accordingly, it is difficult to make the first gap G1 less than the thickness of the first and second rigid members 21 and 22.

According to the joint structure 2000 of an embodiment, as illustrated in FIG. 4, castellated patterns CP1 and CP2 having shapes complementary to each other are respectively provided in the first and second end portions 21a and 22a of the first and second rigid members 21 and 22. The castellated pattern CP1 is a shape in which concave portions and convex portions are repeated along the first end portion 21a. The castellated pattern CP2 has a shape complementary to the castellated pattern CP1. The castellated pattern CP2 is a shape in which convex portions corresponding to the concave portions of the castellated pattern CP1 and concave portions corresponding to the convex portions of the castellated pattern CP1 are repeated along the second end portion 22a.

Figure 5:
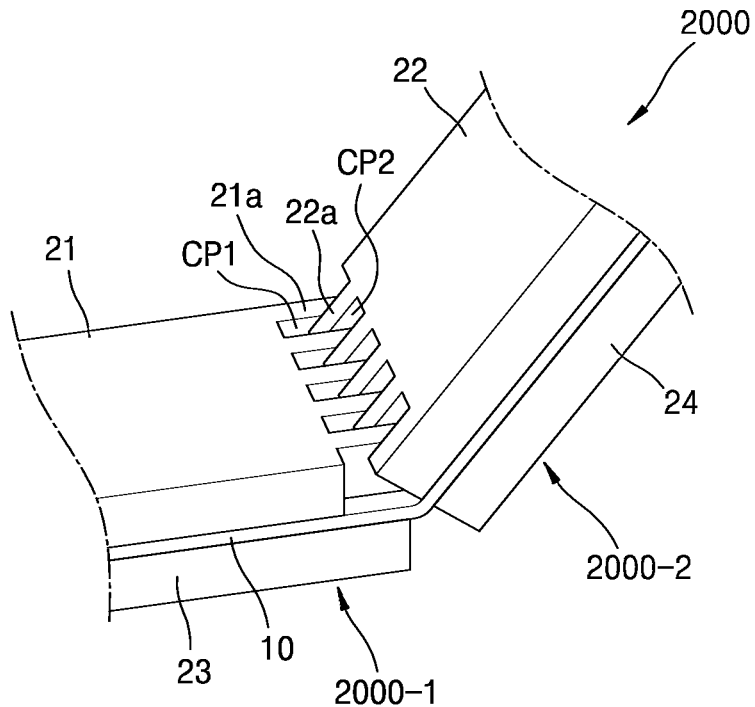
FIG. 5 is a perspective view of the joint portion of FIG. 3 that is rotated.

FIG. 5 is a perspective view showing a rotation state of the joint structure 2000. Referring to FIG. 5, when the second link 2000-2 rotates with respect to the first link 2000-1, the two castellated patterns CP1 and CP2 may overlap each other complementarily. Accordingly, the interference between the first and second end portions 21a and 22a of the first and second rigid members 21 and 22 may be prevented. Theoretically, the first gap G1 may be set to almost close to "0", and the positional stability of the hinge of the joint structure 2000 may be improved. This means that the position of the light source 1001 may be adjusted with high position precision. Furthermore, as illustrated in FIG. 5, when the second link 2000-2 rotates with respect to the first link 2000-1, the two castellated patterns CP1 and CP2 complementarily overlap each other, and thus, the torsion of the first flexible member 10 in the first gap G1 may be prevented. Accordingly, the joint structure 2000 having strong torsional rigidity may be implemented. This means that the positional stability of the first light source 1001-1 may be improved.

Referring to FIG. 3, the joint structure 2000 may include third and fourth rigid members 23 and 24 that are arranged apart from each other with a second gap G2 therebetween on a second surface 12 of the first flexible member 10 to respectively face the first and second rigid members 21 and 22. The third and fourth rigid members 23 and 24 may be panel-shaped members with relative rigidity, such as a polymer film, compressed paper, and the like, compared with the first flexible member 10. As an example, a panel-shaped rigid member is bonded to the second surface 12 of the first flexible member 10, and a portion of the panel-shaped rigid member corresponding to the second gap G2 is incised by using a laser or the like, thereby implementing the third and fourth rigid members 23 and 24 that are arranged apart from each other with the second gap G2 therebetween such that the second gap exposes the second surface 12 of the first flexible member 10. Accordingly, the joint structure 2000 may be implemented where the first link 2000-1 including the first and third rigid members 21 and 23 and the second link 2000-2 including the second and fourth rigid members 22 and 24 are rotatably connected to each other by using the first flexible member 10 that is flexible and exposed through the first and second gaps G1 and G2. The first and second gaps G1 and G2 may be identical to or different from each other. In an embodiment, the first and second gaps G1 and G2 are identical to each other.

Figure 6:
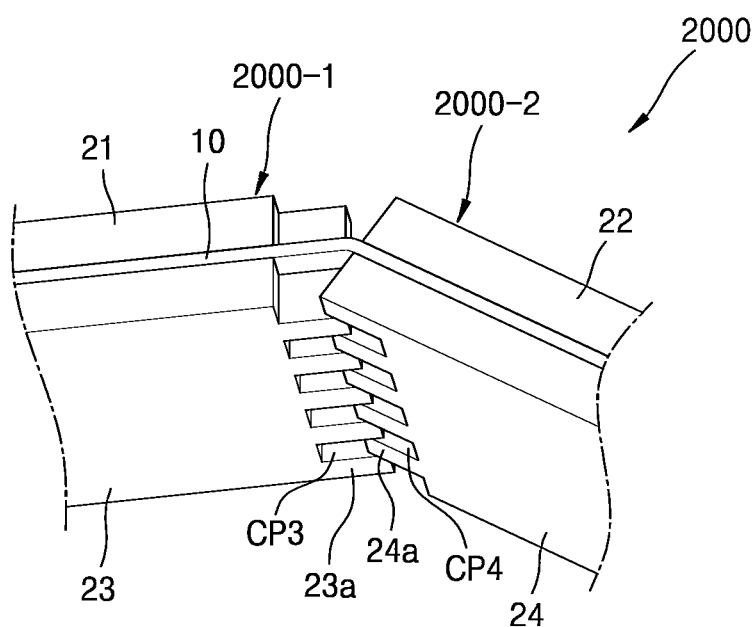
FIG. 6 is a perspective view of the joint portion of FIG. 3 that is rotated.

FIG. 6 is a perspective view showing a rotation state of the joint structure 2000. Referring to FIG. 6, castellated patterns CP3 and CP4 having shapes complementary to each other are respectively provided in third and fourth end portions 23a and 24a adjacent to the second gap G2 of the third and fourth rigid members 23 and 24. The castellated pattern CP3 has a shape in which concave portions and convex portions are repeated along the third end portion 23a. The castellated pattern CP4 has a shape complementary to the castellated pattern CP3. The castellated pattern CP4 has a shape in which convex portions corresponding to the concave portions of the castellated pattern CP3 and concave portions corresponding to the convex portions of the castellated pattern CP3 are repeated along the fourth end portion 24a.

When the second link 2000-2 is rotated with respect to the first link 2000-1 in a direction opposite to the rotation direction shown in FIG. 5, the two castellated patterns CP3 and CP4 may overlap each other complementarily. Accordingly, the interference of the third and fourth end portions 23a and 24a of the third and fourth rigid members 23 and 24 may be prevented. Furthermore, theoretically, the second gap G2 may be set to almost close to "0", and the positional stability of the hinge of the joint structure 2000 may be improved. This means that the position of the light source 1001 may be adjusted with high position precision. Furthermore, as the torsion of the first flexible member 10 may be prevented in the second gap G2, the torsional rigidity of the joint structure 2000 may be reinforced.

Figure 7:
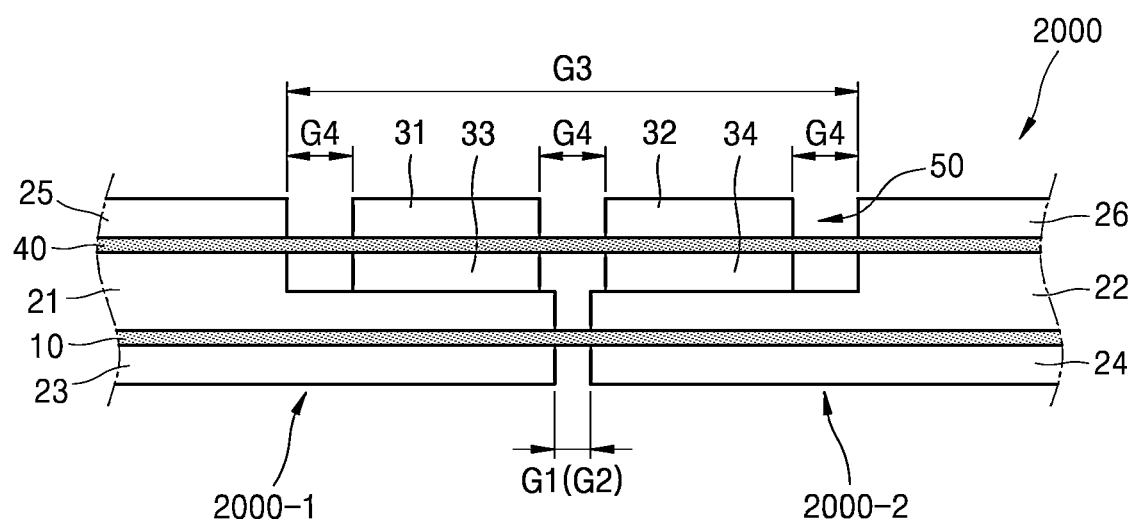
FIG. 7 is a schematic cross-sectional view of a joint portion according to an embodiment.
Figure 8:
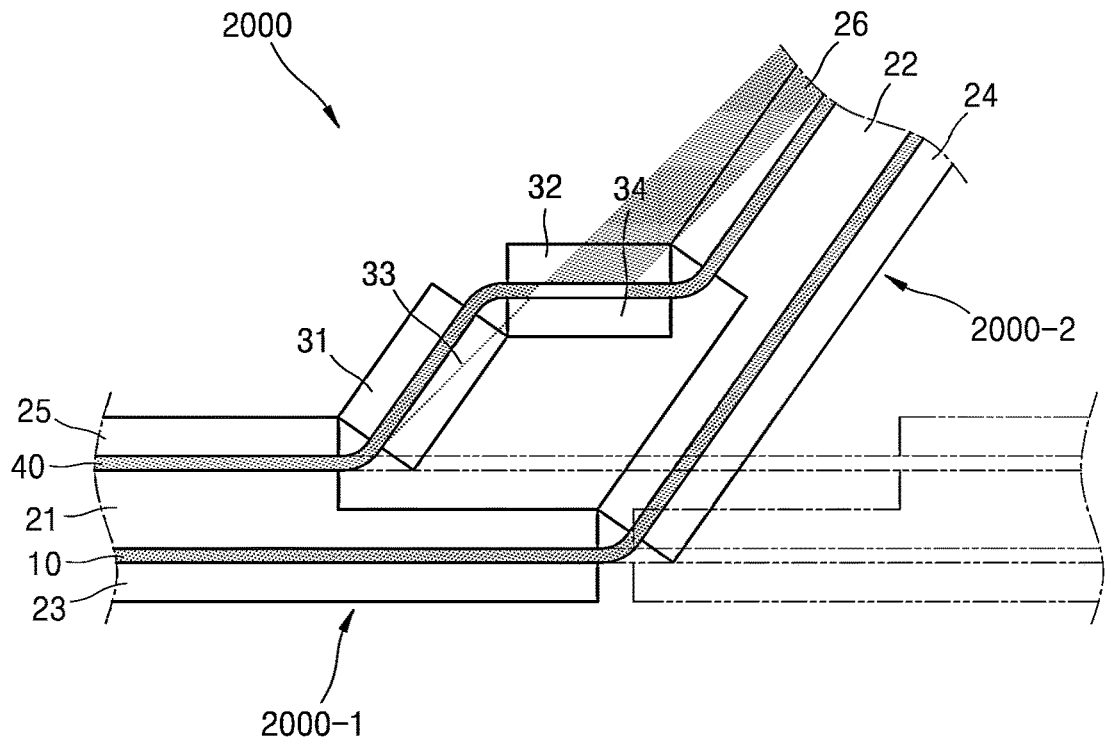
FIG. 8 is a schematic cross-sectional view of the joint portion of FIG. 7 that is rotated, according to an embodiment.

FIG. 7 is a schematic cross-sectional view of the joint structure 2000, according to an embodiment. FIG. 8 is a schematic cross-sectional view of the joint structure 2000 of FIG. 7 that is rotated. The same constituent elements as those in the embodiment shown in FIGS. 3 to 6 are indicated by using the same reference numerals, and differences from the embodiments shown in FIGS. 3 to 6 are mainly described.

Referring to FIGS. 7 and 8, a second flexible member 40 is provided on the first and second rigid members 21 and 22. Fifth and sixth rigid members 25 and 26 are arranged on the second flexible member 40. The fifth and sixth rigid members 25 and 26 are arranged apart from each other with a third gap G3 therebetween to respectively face the first and second rigid members 21 and 22, wherein the third gap G3 is greater (e.g., larger) than the first gap G1. A recess portion 50 corresponding to the third gap G3 is provided in the first and second rigid members 21 and 22. In other words, a first recess portion may be formed in the first rigid member 21 and a second recess portion may be formed in the second rigid member 22 such that the first and second recess portions may collectively be referred to as the recess portion 50. Two or more rigid segment members may be arranged on at least one surface of the second flexible member 40 with a fourth gap G4 therebetween, at a position corresponding to the third gap G3, for example, in the recess portion 50. In other words, at least one fourth gap may be provided between adjacent ones of the two or more rigid segment members such that the at least one fourth gap exposes at least one surface of the second flexible member 40. In FIGS. 7 and 8, the first, second, and fourth gaps G1, G2, and G4 are illustrated exaggeratedly. In an embodiment, rigid segment members 31 and 32 and rigid segment members 33 and 34 are arranged on both surfaces of the second flexible member 40 as shown, e.g., in FIG. 7. The second flexible member 40 may be in the form of a flexible material, such as textile and the like, and an elastic member, such as a polymer material and the like, stacked on or combined with each other. The fifth and sixth rigid members 25 and 26 and the rigid segment members 31, 32, 33, and 34 may be formed as thin plates having relative rigidity, such as a polymer film, compressed paper, and the like. Accordingly, the joint structure 2000 may be implemented where the first link 2000-1 including the first, third, and fifth rigid members 21, 23, and 25 and the second link 2000-2 including the second, fourth, and sixth rigid members 22, 24, and 26 are rotatably connected to each other by using the first and second flexible members 10 and 40 that are flexible and exposed in the first, second, and third gaps G1, G2, and G3, and the rigid segment members 31, 32, 33, and 34. The first and second gaps G1 and G2 may be identical to or different from each other. In an embodiment, the first and second gaps G1 and G2 are identical to each other.

Referring to FIG. 8, when the second link 2000-2 rotates with respect to the first link 2000-1, the first flexible member 10 functions as a hinge. Furthermore, the rigid segment members 31 and 33 and the rigid segment members 32 and 34 are consecutively rotated by using, as a hinge, the second flexible member 40 exposed through the fourth gap G4 hinge, and supported on each other, between the first link 2000-1 and the second link 2000-2. Accordingly, the torsional rigidity of the first and second flexible members 10 and 40 in the hinge may be compensated for, and the sagging of the first and second flexible members 10 and 40 in the hinge due to an external force may be reduced. When the first link 2000-1 and the second link 2000-2 are twisted, torsion stress concentrates on the first flexible member 10 that includes a flexible material. In particular, when the first link 2000-1 and the second link 2000-2 make 180°, the torsion stress concentrates on the first flexible member 10. By employing the rigid segment members 31, 32, 33, and 34, even when the first link 2000-1 and the second link 2000-2 make 180°, the torsion stress may be distributed by the rigid segment members 31, 32, 33, and 34. Furthermore, when the first link 2000-1 and the second link 2000-2 make a degree other than 180°, the rigidity of the joint structure 2000 may be maintained by the interference of the rigid segment members 31, 32, 33, and 34. This means that the position of the light source 1001 may be adjusted with high position precision.

Figure 9:
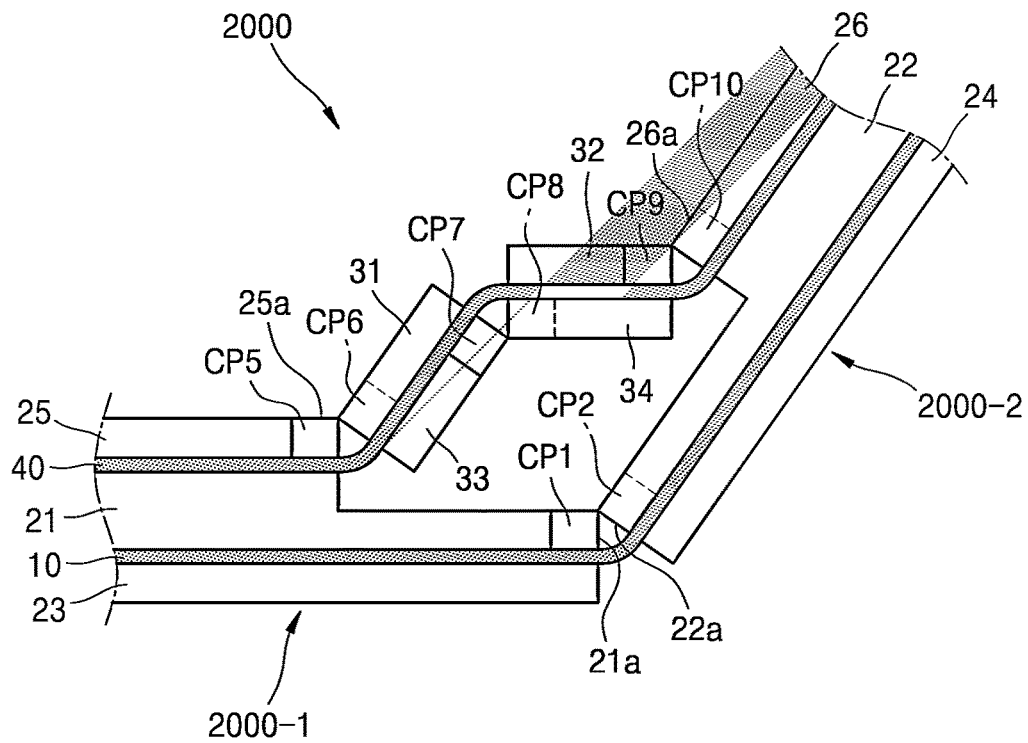
FIG. 9 is a schematic cross-sectional view of a joint portion according to an embodiment.

FIG. 9 is a schematic cross-sectional view of the joint structure 2000 according to an embodiment. The joint structure 2000 of an embodiment is different from the joint structure 2000 of the embodiment shown in FIG. 7 and FIG. 8, in that a castellated pattern is employed. Differences are mainly described below. Referring to FIG. 9, castellated patterns CP5, CP6, CP7, CP8, CP9, and CP10 having complementary shapes are respectively provided in fifth and sixth end portions 25a and 26a of the fifth and sixth rigid members 25 and 26 adjacent to the third gap G3, and in end portions of the rigid segment members 31, 32, 33, and 34. The castellated patterns CP1 and CP2 may be respectively provided in the first and second end portions 21a and 22a of the first and second rigid members 21 and 22. According to the configuration as above, when the first and second links 2000-1 and 2000-2 rotate with respect to each other, interference may be prevented, and thus, the positional stability of the hinge of the joint structure 2000 may be improved. As the torsion of the first and second flexible members 10 and 40 may be prevented, the torsional rigidity of the joint structure 2000 may be reinforced.

Figure 10:
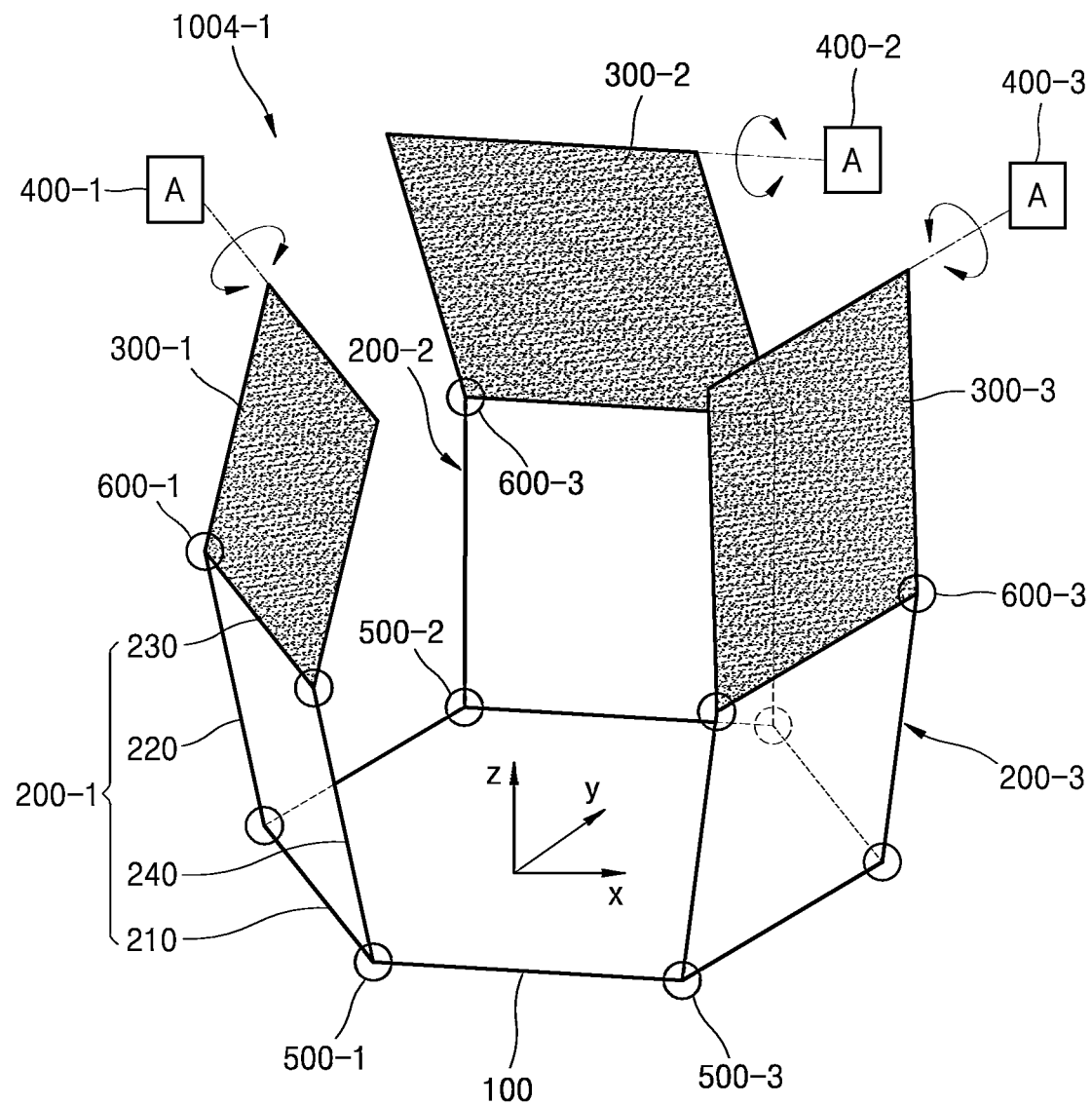
FIG. 10 is a schematic view showing a configuration of a multi-DOF moving stage according to an embodiment.

Referring back to FIG. 2, the actuators 400-1, 400-2, and 400-3 of the multi-DOF moving stage 1004-1 may respectively drive the driving links 300-1, 300-2, and 300-3 to rotate. FIG. 10 is a schematic view showing a configuration of the multi-DOF moving stage 1004-1 according to an embodiment. Referring to FIG. 10, the three driven links 200-1, 200-2, and 200-3 are connected to the end-effector 100 at equiangular intervals, for example, at intervals of 120°, via the first joint portions 500-1, 500-2, and 500-3. The first joint portion 500-1 may have the same structure as the joint structure 2000 shown in FIGS. 3 to 9. The three driven links 200-1, 200-2, and 200-3 may be respectively connected to the three driving links 300-1, 300-2, and 300-3 via the second joint portions 600-1, 600-2, and 600-3. The three actuators 400-1, 400-2, and 400-3 may respectively drive the three driving links 300-1, 300-2, and 300-3 to rotate. The three driven links 200-1, 200-2, and 200-3 may each include first to fourth arms 210, 220, 230, and 240 connected in the form of a parallelogram. As the structures of the three driven links 200-1, 200-2, and 200-3 are the same, the driven link 200-1 is described below as an example.

Figure 11:
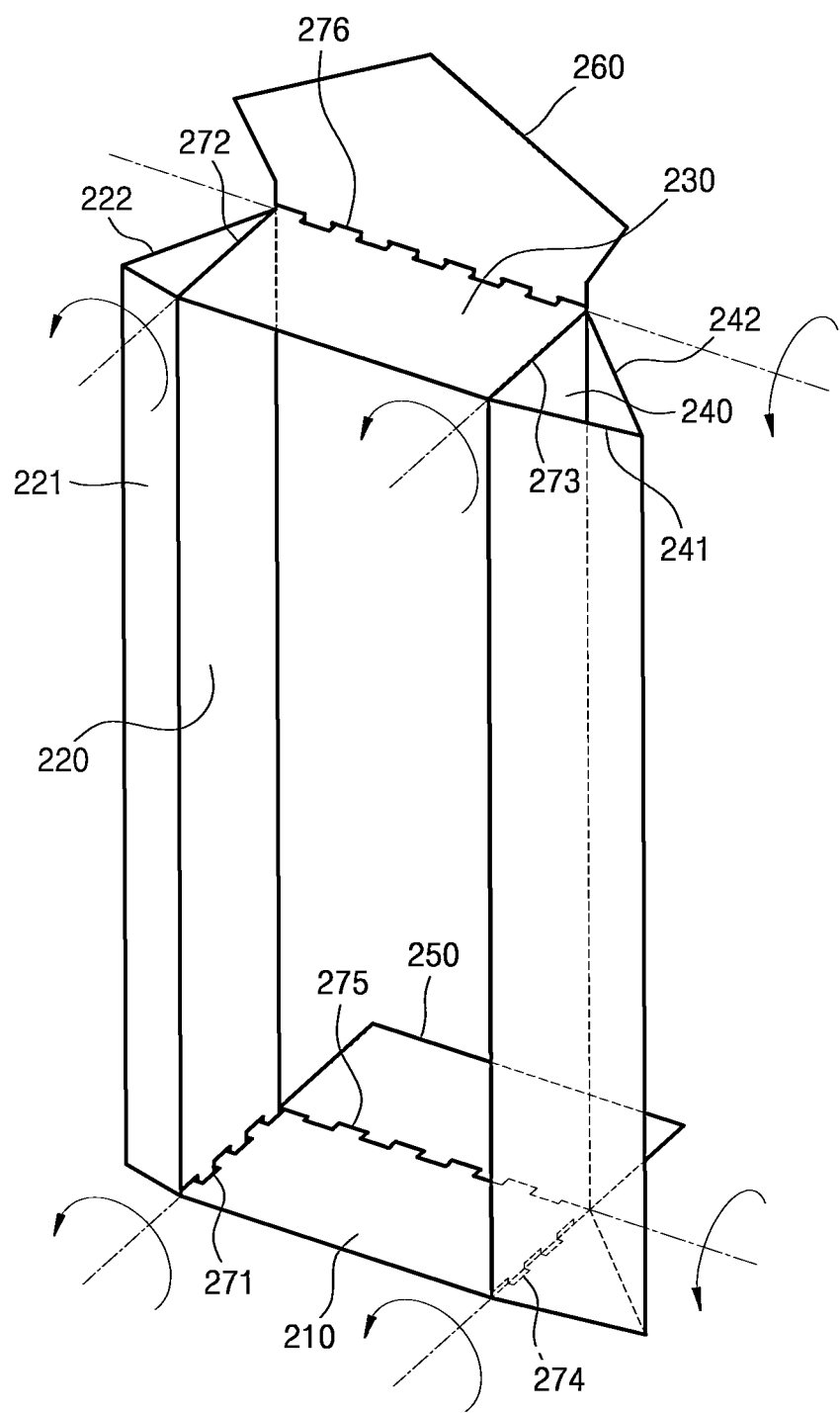
FIG. 11 is a schematic perspective view of a driven link according to an embodiment.
Figure 12:
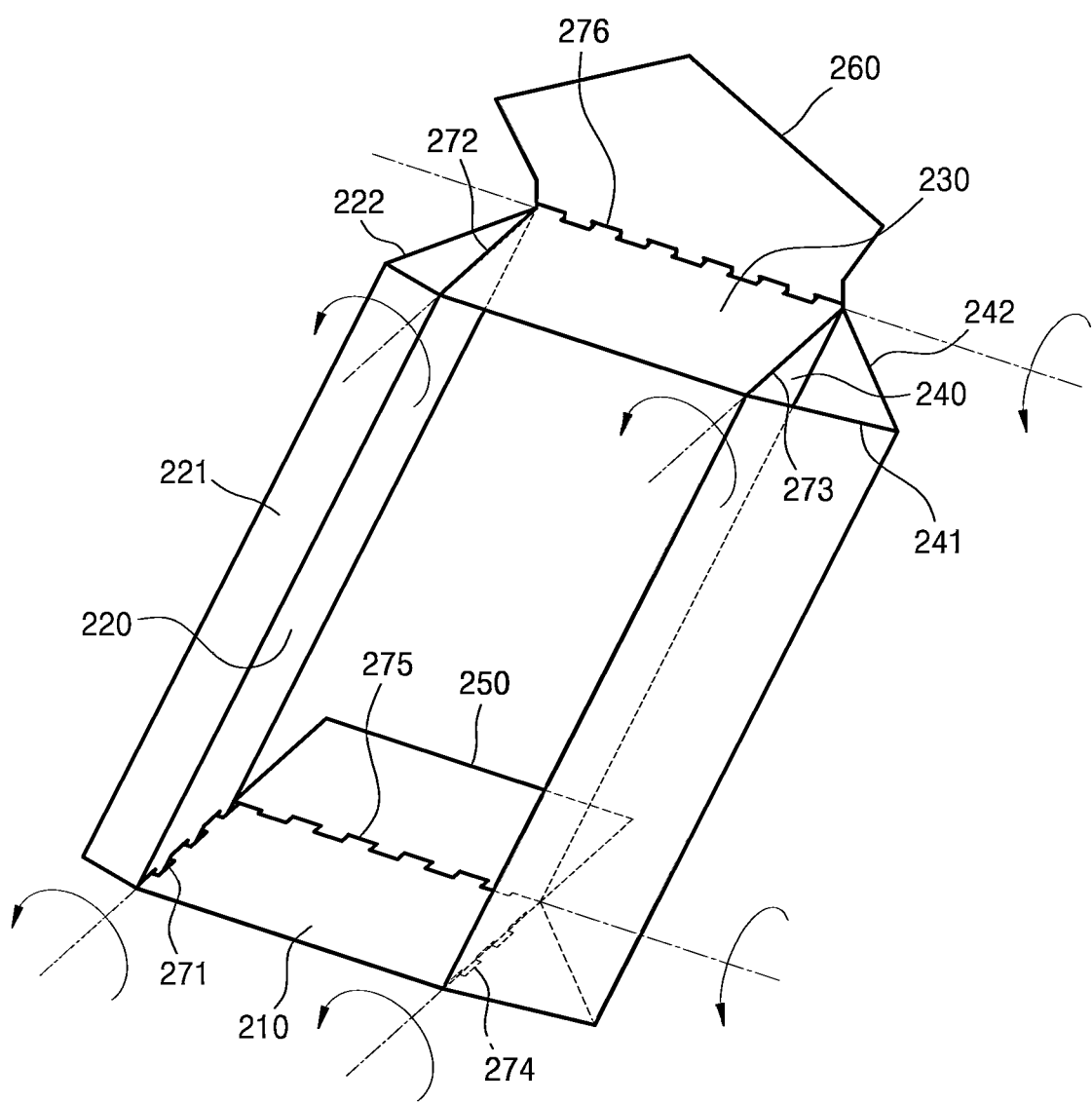
FIG. 12 is a schematic perspective view of the driven link of FIG. 11 that is transformed while maintaining a parallelogram.

FIG. 11 is a schematic perspective view of the driven link 200-1 according to an embodiment. FIG. 12 is a schematic perspective view of the driven link 200-1 of FIG. 11 that is transformed while maintaining a parallelogram. Referring to FIGS. 10 to 12, the driven link 200-1 may include the first to fourth arms 210, 220, 230, and 240 connected in the form of a parallelogram. The first to fourth arms 210, 220, 230, and 240 form a parallelogram and may be connected by third joint portions 271, 272, 273, and 274 to be pivotable with respect to each other. The third joint portions 271, 272, 273, and 274 may have the same structure as the joint structure 2000 described above with reference to FIGS. 3 to 9.

The first arm 210 is rotatably connected to the end-effector 100 via the first joint portion 500-1. For example, a first connection portion 250 is rotatably connected to the first arm 210 via a joint portion 275. The first connection portion 250 is coupled to the end-effector 100. The joint portion 275 functions as the first joint portion 500-1. The third arm 230 facing the first arm 210 is rotatably connected to the driving link 300-1 via the second joint portion 600-1. For example, a second connection portion 260 is rotatably connected to the third arm 230 via a joint portion 276. The second connection portion 260 is coupled to the driving link 300-1. The joint portion 276 functions as the second joint portion 600-1.

For example, the rotational axis of the first joint portion 500-1, that is, the joint portion 275, and the rotational axis of the second joint portion 600-1, that is, the joint portion 276, may be parallel to each other. The rotational axes of the third joint portions 271, 272, 273, and 274 are parallel to each other. The rotational axes of the first joint portion 500-1 and the second joint portion 600-1 may be perpendicular to the rotational axes of the third joint portions 271, 272, 273, and 274. The first to fourth arms 210, 220, 230, and 240 of the driven link 200-1 may be rotated around the third joint portions 271, 272, 273, and 274 as axes, while maintaining a parallelogram shape, as illustrated in FIG. 12.

Referring to FIGS. 11 and 12, to reinforce the rigidity of the first to fourth arms 210, 220, 230, and 240, at least one of the first to fourth arms 210, 220, 230, and 240 may have a bent hollow prism shape. In an embodiment, the second and fourth arms 220 and 240 may each have a bent hollow triangular prism shape. The second arm 220 may form a hollow triangular prism with reinforcement plates 221 and 222, and the fourth arm 240 may form a hollow triangular prism with reinforcement plates 241 and 242. According to the configuration as above, an increase in the moment of inertia of the driven link 200-1 may be reduced and the rigidity of the driven link 200-1 may be increased. Although FIGS. 11 and 12 illustrate the driven link 200-1 having arms of a hollow triangular prism shape, as necessary, at least one of arms of the driven link 200-1 may have a shape such as a quadrangular prism, a pentagonal prism, and the like.

Figure 13:
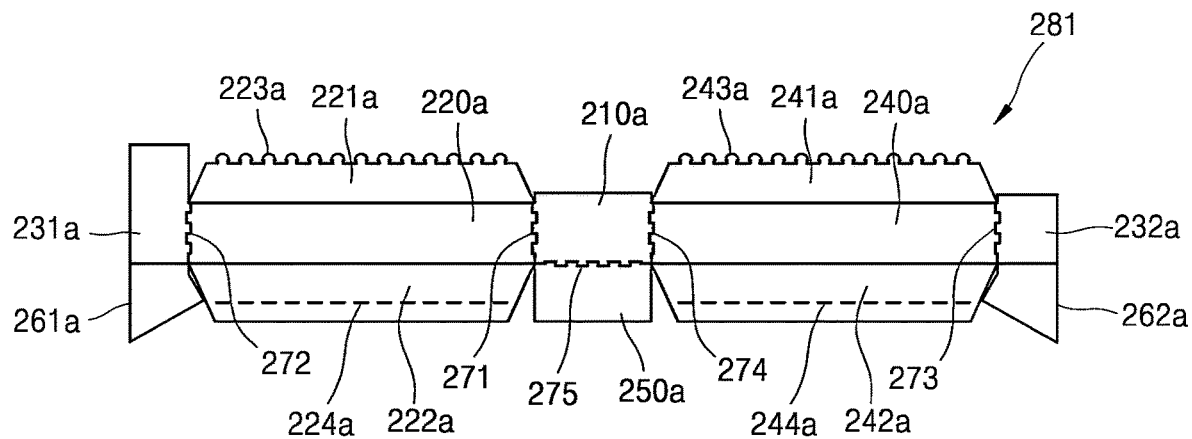
FIG. 13 is a development of an inner rigid member to implement the driven link of FIG. 11, according to an embodiment.
Figure 14:
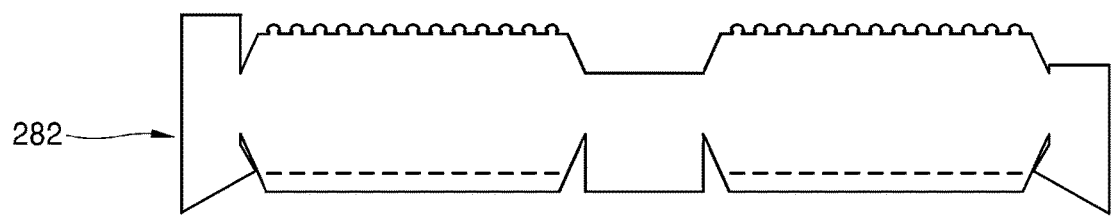
FIG. 14 is a development of a flexible member to implement the driven link of FIG. 11, according to an embodiment.
Figure 15:
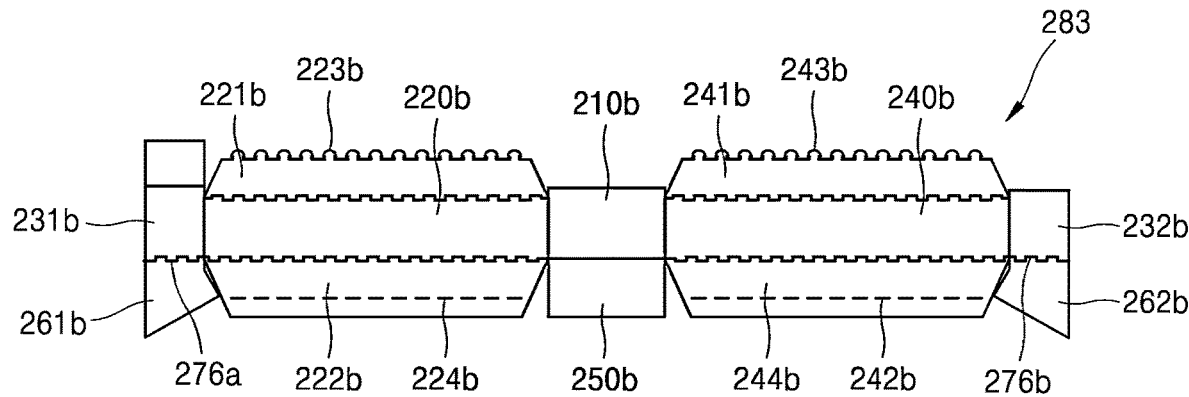
FIG. 15 is a development of an outer rigid member to implement the driven link of FIG. 11, according to an embodiment.

FIG. 13 is a development of an inner rigid member 281 to implement the driven link 200-1 of FIG. 11, according to an embodiment. FIG. 14 is a development of a flexible member 282 to implement the driven link 200-1 of FIG. 11, according to an embodiment. FIG. 15 is a development of an outer rigid member 283 to implement the driven link 200-1 of FIG. 11, according to an embodiment. Referring to FIG. 11 and FIGS. 13 to 15, the inner rigid member 281 and the outer rigid member 283 may each be bonded to a surface and an opposing surface of the flexible member 282 by using an adhesive. The flexible member 282 may include a flexible material, such as a film, textile, and the like. The flexible member 282 may include an elastic member. For example, the flexible member 282 may be in the form of a flexible material, such as textile and the like, and an elastic member, such as a polymer material and the like, stacked on or combined with each other. The inner rigid member 281 and the outer rigid member 283 may each be formed in a thin rigid plate, such as a polymer film, compressed paper, and the like. An incision line between a plurality of plates of the inner rigid member 281 and the outer rigid member 283 may be formed by laser processing, mechanical processing, and the like. The incision line may be formed before or after the inner rigid member 281 and the outer rigid member 283 are bonded to the flexible member 282. The first to third joint portions 500-1, 500-2, and 500-3; 600-1, 600-2, and 600-3; and 271, 272, 273, and 274 may have the joint structure 2000 shown in FIGS. 3 to 9, as described above. The flexible member 282 may function as the first flexible member 10 of FIG. 3. The inner rigid member 281 and the outer rigid member 283 may function as the first to fourth rigid members 21, 22, 23, and 24 of FIG. 3.

A first inner plate 210a of the inner rigid member 281 and a first outer plate 210b of the outer rigid member 283 corresponding thereto are bonded to both sides of the flexible member 282, thereby forming the first arm 210. A second inner plate 220a of the inner rigid member 281 and a second outer plate 220b of the outer rigid member 283 corresponding thereto are bonded to both sides of the flexible member 282, thereby forming the second arm 220. The third joint portion 271 is provided between the first inner plate 210a and the second inner plate 220a. The first arm 210 and the second arm 220 may respectively correspond to the first link 2000-1 and the second link 2000-2, in the joint structure 2000 shown in FIGS. 3 to 9. The third joint portion 271 may have a structure including the castellated pattern described above. Accordingly, the linkage and the joint may be integrally implemented. A fourth inner plate 240a of the inner rigid member 281 and a fourth outer plate 240b of the outer rigid member 283 corresponding thereto are bonded to both sides of the flexible member 282, thereby forming the fourth arm 240. The third joint portion 274 is provided between the first inner plate 210a and the fourth inner plate 240a. The first arm 210 and the fourth arm 240 may respectively correspond to the first link 2000-1 and the second link 2000-2 in the joint structure 2000 shown in FIGS. 3 to 9. The third joint portion 274 may have a structure including the castellated pattern described above. Accordingly, the linkage and the joint may be integrally implemented.

A first inner connection plate 250a is provided on a long side of the first inner plate 210a of the inner rigid member 281. A first outer connection plate 250b is provided on a long side of the first outer plate 210b of the outer rigid member 283. When the inner rigid member 281 and the outer rigid member 283 are bonded to both sides of the flexible member 282, the first inner connection plate 250a and the first outer connection plate 250b overlap each other to thereby form the first connection portion 250. The joint portion 275 is provided between the first inner plate 210a and the first inner connection plate 250a. The joint portion 275 forms the first joint portion 500-1. The first arm 210 and the first connection portion 250 may respectively correspond to the first link 2000-1 and the second link 2000-2 in the joint structure 2000 shown in FIGS. 3 to 9. The joint portion 275 may have a structure including the castellated pattern described above. Accordingly, the linkage and the joint may be integrally implemented.

A first inner segment plate 231a of the inner rigid member 281 and a first outer segment plate 231b of the outer rigid member 283 corresponding thereto are bonded to both sides of the flexible member 282. The third joint portion 272 is provided between the second inner plate 220a and the first inner segment plate 231a. A second inner segment plate 232a of the inner rigid member 281 and a second outer segment plate 232b of the outer rigid member 283 corresponding thereto are bonded to both sides of the flexible member 282. The third joint portion 273 is provided between the fourth inner plate 240a and the second inner segment plate 232a. The first and second inner segment plates 231a and 232a and the first and second outer segment plates 232a and 232b form the third arm 230. The third joint portions 272 and 273 may each have a structure including the castellated pattern described above. The second arm 220 and the third arm 230 may respectively correspond to the first link 2000-1 and the second link 2000-2 in the joint structure 2000 shown in FIGS. 3 to 9. The third arm 230 and the fourth arm 240 may respectively correspond to the first link 2000-1 and the second link 2000-2 in the joint structure 2000 shown in FIGS. 3 to 9. The third joint portions 272 and 273 may each have a structure including the castellated pattern described above. Accordingly, the linkage and the joint may be integrally implemented.

A first inner connection plate 261a is provided on the first inner segment plate 231a of the inner rigid member 281. A first outer connection plate 261b is provided on the first outer segment plate 231b of the outer rigid member 283. A second inner connection plate 262a is provided on the second inner segment plate 232a of the inner rigid member 281. A second outer connection plate 262b is provided on the second outer segment plate 232b of the outer rigid member 283. When the inner rigid member 281 and the outer rigid member 283 are bonded to both sides of the flexible member 282, the first inner connection plate 261a and the second inner connection plate 262a overlap the first outer connection plate 261b and the second outer connection plate 262b, respectively. Joint portions 276a and 276b are respectively provided between the first outer segment plate 231b and the first outer connection plate 261b and between the second outer segment plate 232b and the second outer connection plate 262b. The joint portions 276a and 276b form the joint portion 276. The joint portion 276 functions as the second joint portion 600-1. The first and second inner connection plates 261a and 262a and the first and second outer connection plates 261b and 262b form the second connection portion 260. The third arm 230 and the second connection portion 260 may respectively correspond to the first link 2000-1 and the second link 2000-2 in the joint structure 2000 shown in FIGS. 3 to 9. The joint portions 276a and 276b may have a structure including the castellated pattern described above. Accordingly, the linkage and the joint may be integrally implemented.

A first inner reinforcement plate 221a and a second inner reinforcement plate 222a are provided on two long sides of the second inner plate 220a of the inner rigid member 281. A first outer reinforcement plate 221b and a second outer reinforcement plate 222b are provided on two long sides of the second outer plate 220b of the outer rigid member 283. When the inner rigid member 281 and the outer rigid member 283 are bonded to both sides of the flexible member 282, the first inner reinforcement plate 221a and the second inner reinforcement plate 222a respectively overlap the first outer reinforcement plate 221b and the second outer reinforcement plate 222b to thereby form the reinforcement plates 221 and 222. The reinforcement plates 221 and 222, with the second arm 220, form a triangular prism. For example, protrusions 223a and 223b may be respectively provided at edges of the first inner reinforcement plate 221a and the first outer reinforcement plate 221b, and slits 224a and 224b may be respectively provided at edges of the second inner reinforcement plate 222a and the second outer reinforcement plate 222b. When the reinforcement plates 221 and 222 are folded and the protrusions 223a and 223b are inserted into the slits 224a and 224b, respectively, the reinforcement plates 221 and 222, with the second arm 220, may form a triangular prism.

A first inner reinforcement plate 241a and a second inner reinforcement plate 242a are provided on two long sides of the fourth inner plate 240a of the inner rigid member 281. A first outer reinforcement plate 241b and a second outer reinforcement plate 242b are provided on two long sides of the fourth outer plate 240b of the outer rigid member 283. When the inner rigid member 281 and the outer rigid member 283 are bonded to both sides of the flexible member 282, the first inner reinforcement plate 241a and the second inner reinforcement plate 242a respectively overlap the first outer reinforcement plate 241b and the second outer reinforcement plate 242b to thereby form the reinforcement plates 241 and 242. The reinforcement plates 241 and 242, with the fourth arm 240, form a triangular prism. For example, protrusions 243a and 243b may be respectively provided at edges of the first inner reinforcement plate 241a and the first outer reinforcement plate 241b, and slits 244a and 244b may be respectively provided at edges of the second inner reinforcement plate 242a and the second outer reinforcement plate 242b. When the reinforcement plates 241 and 242 are folded and the protrusions 243a and 243b are inserted into the slits 244a and 244b, respectively, the reinforcement plates 241 and 242, with the fourth arm 240, may form a triangular prism.

According to an embodiment, as the driven link 200-1 including the first and second joint portions 275 and 276, and the third joint portions 271, 272, 273, and 274, may be formed by using a light material, the moment of inertia of the driven link 200-1 may be decreased so that the multi-DOF moving stage 1004 capable of a high speed and precise driving may be implemented. Furthermore, as the driven link 200-1 having a parallelogram shape and capable of pivoting may be implemented by an origami method, the multi-DOF moving stage 1004 having a simple structure may be implemented at a low cost.

According to the configuration described above, the actuators 400-1, 400-1, and 400-3 may rotate the driving links 300-1, 300-2, and 300-3, respectively. The first to fourth arms 210, 220, 230, and 240 of each of the driven links 200-1, 200-2, and 200-3 are rotated while maintaining a parallelogram shape, as illustrated in FIGS. 11 and 12, and rotate around the third joint portions 271, 272, 273, and 274 as axes, so that displacements in X, Y, and Z directions occur in a portion where the driven links 200-1, 200-2, and 200-3 are connected to the end-effector 100. As such, by adjusting the driving amounts of the three actuators 400-1, 400-2, and 400-3, the end-effector 100 may be translated in the X, Y, and Z directions. Furthermore, the end-effector 100 may be rotated with respect to X, Y, and Z axes. For example, the first light source 1001-1 is translated in the X, Y, and Z directions by driving the first multi-DOF moving stage 1004-1, and thus, left-eye image light may be provided to the left pupil P1. The second light source 1001-2 is translated in the X, Y, and Z directions by driving the second multi-DOF moving stage 1004-2, and thus, right-eye image light may be provided to the right pupil P2.

For example, the positions of the left pupil P1 and the right pupil P2 are tracked by using an eye tracking sensor 1003. The spatial coordinates of the first light source 1001-1 and the second light source 1001-2 to provide the left-eye image and the right-eye image respectively to the left pupil P1 and the right pupil P2 are calculated based on the positions of the left pupil P1 and the right pupil P2. The driving amounts of the actuators 400-1, 400-2, and 400-3 to move the first light source 1001-1 and the second light source 1001-2 to positions corresponding to the calculated spatial coordinates are calculated, and the actuators 400-1, 400-2, and 400-3 are driven based on the calculation. Accordingly, even when the left pupil P1 and the right pupil P2 are moved, the left-eye image and the right-eye image may be provided to the left pupil P1 and the right pupil P2, respectively.

Figure 16:
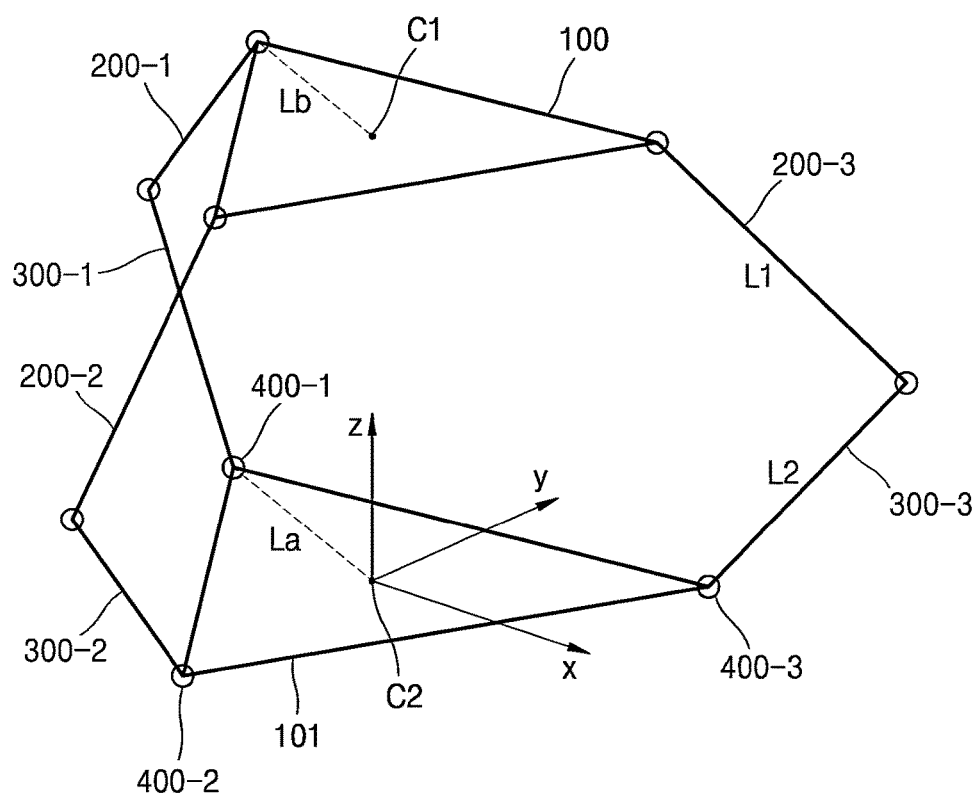
FIG. 16 is a schematic diagram of a multi-DOF moving stage according to an embodiment.
Figure 17:
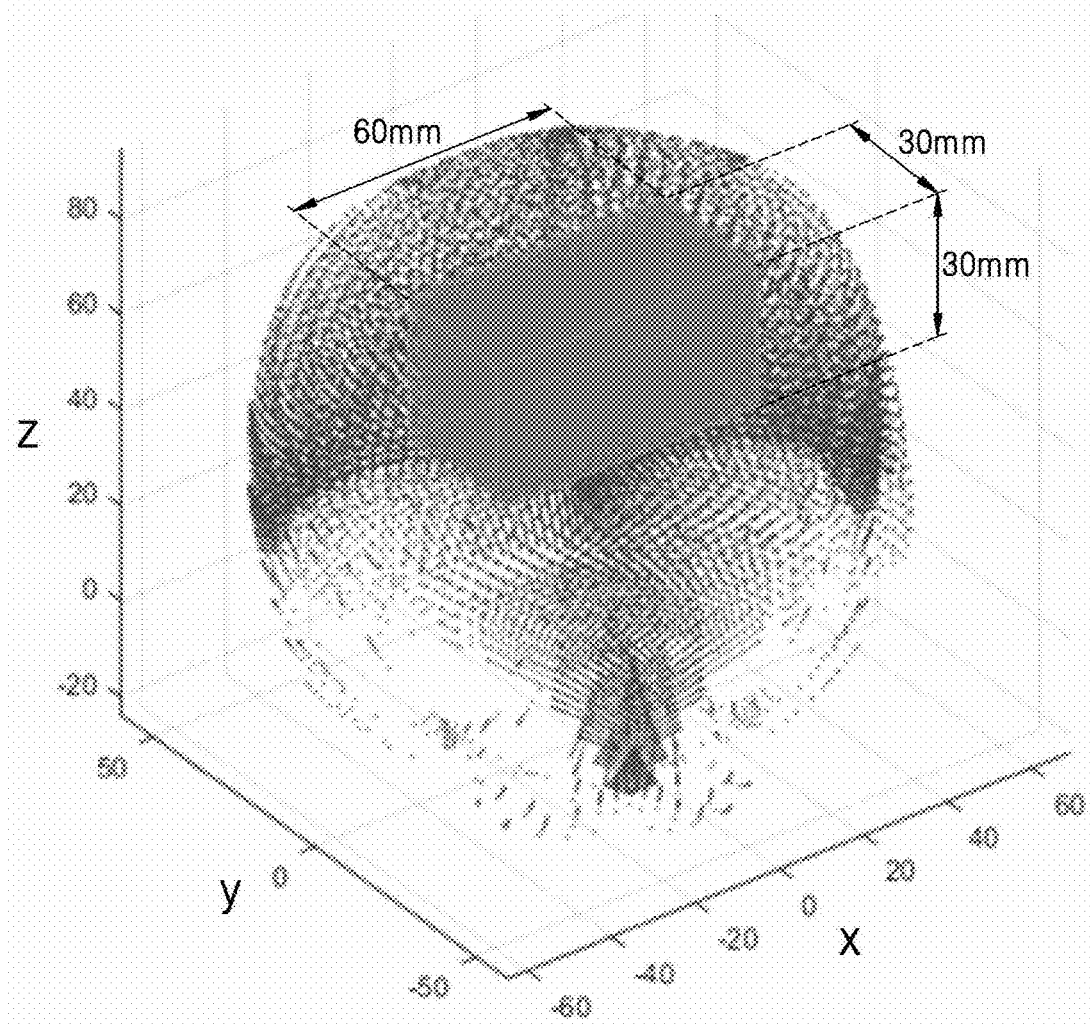
FIG. 17 is a graph showing an example of a work space of the multi-DOF moving stage of FIG. 16, according to an embodiment.

FIG. 16 is a schematic diagram of the multi-DOF moving stage 1004 according to an embodiment, and FIG. 17 is a graph showing an example of a work space of the multi-DOF moving stage 1004 of FIG. 16, according to an embodiment. Referring to FIG. 16, La is a distance, to the actuators 400-1, 400-2, and 400-3, from a center C2 of a base 101 where the actuators 400-1, 400-2, and 400-3 are installed. Lb is a distance from a center C1 of the end-effector 100 to driven links 200-1, 200-2, and 200-3. L1 is a length of each of the driven links 200-1, 200-2, and 200-3. L2 is a length of each of the driving links 300-1, 300-2, and 300-3. For example, when La=20 mm, Lb=14 mm, L1=60 mm, and L2=35 mm, a result of simulation of a work space of the end-effector 100 is illustrated in FIG. 17. Referring to FIG. 17, it may be seen that a work space of 60 mm×30 mm×30 mm may be obtained by the multi-DOF moving stage 1004 that is very compact. The work space may be sufficiently applied to the display apparatus 1000 that generally needs the view box VB having a size of 60 mm×30 mm×30 mm.

Although in the embodiments described above the three driven links 200-1, 200-2, and 200-3 are arranged at intervals of 120°, the disclosure is not necessarily limited thereto. For example, the three driven links 200-1, 200-2, and 200-3 may be arranged at intervals of 90°. In this case, to address behavioral instability due to the singularity effect, the length of at least one of the three driving links 300-1, 300-2, and 300-3 may be made different from the rest. In this case, the lengths of the three driven links 200-1, 200-2, and 200-3 may be identical to or different from one another. The lengths of the three driving links 300-1, 300-2, and 300-3 may be made identical to each other, and the length of at least one of the three driven links 200-1, 200-2, and 200-3 may be made different from the rest. The length of the driven link (200-1, 200-2, and 200-3) refers to the length of the second arm 220 or the fourth arm 240.

Figure 18:
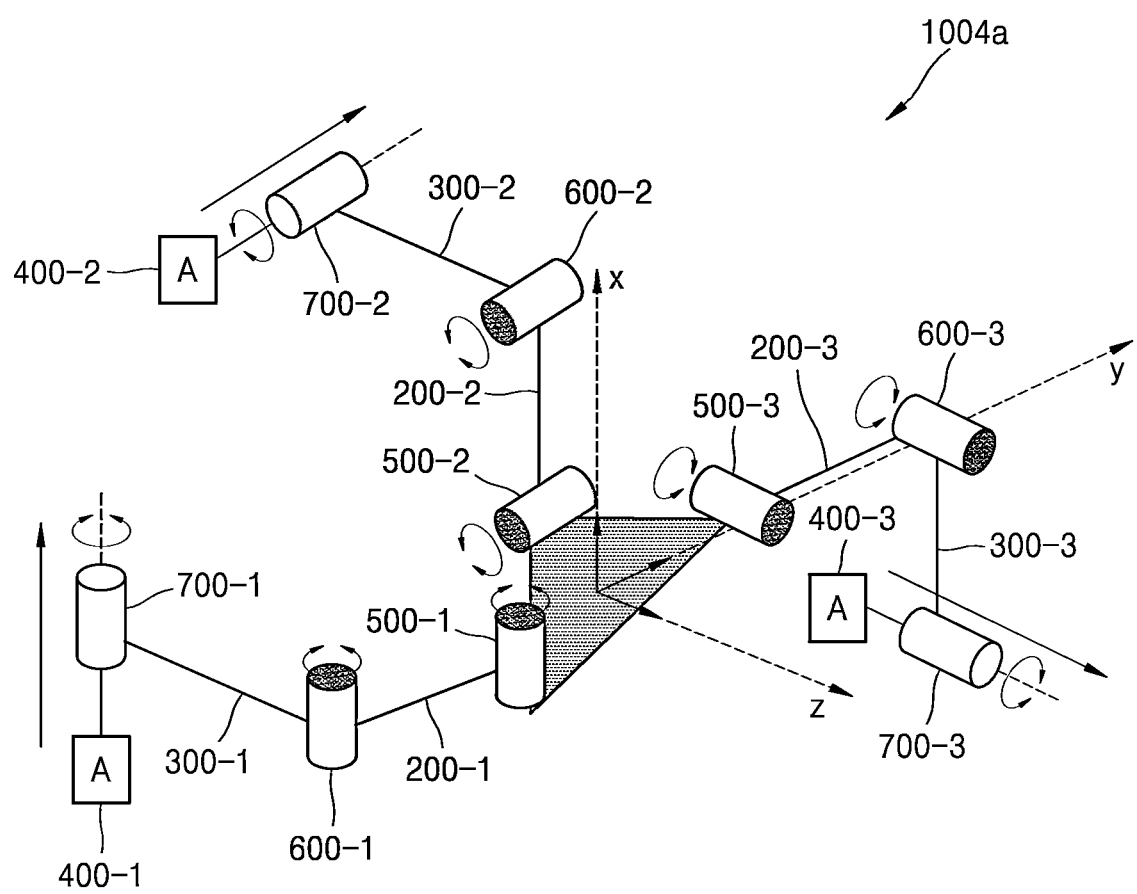
FIG. 18 is a schematic view of a configuration of a multi-DOF moving stage according to an embodiment.

FIG. 18 is a schematic view of a configuration of a multi-DOF moving stage 1004a according to an embodiment. The multi-DOF moving stage 1004a of an embodiment is different from the multi-DOF moving stage 1004 described above in that the actuators 400-1, 400-2, and 400-3 respectively drive the driving links 300-1, 300-2, and 300-3 to translate. The multi-DOF moving stage 1004a may be employed as the first and second multi-DOF moving stages 1004-1 and 1004-2 shown in FIG. 1.

Referring to FIG. 18, the driving links 300-1, 300-2, and 300-3 are connected to the actuators 400-1, 400-2, and 400-3 via fourth joint portions 700-1, 700-2, and 700-3. For example, the actuator 400-1 drives the driving link 300-1 to translate in the X direction. The driving link 300-1 is connected to the actuator 400-1 via the fourth joint portion 700-1. The first joint portion 500-1, the second joint portion 600-1, and the fourth joint portion 700-1 are rotary joint portions using the X-axis as a rotational axis. The actuator 400-2 drives the driving link 300-2 to translate in the Y direction. The driving link 300-2 is connected to the actuator 400-2 via the fourth joint portion 700-2. The first joint portion 500-2, the second joint portion 600-2, and the fourth joint portion 700-2 are rotary joint portions using the Y-axis as a rotational axis. The actuator 400-3 drives the driving link 300-3 to translate in the Z direction. The driving link 300-3 is connected to the actuator 400-3 via the fourth joint portion 700-3. The first joint portion 500-3, the second joint portion 600-3, and the fourth joint portion 700-3 are rotary joint portions using the Z-axis as a rotational axis. The joint structure 2000 shown in FIGS. 3 to 9 may be applied to at least one of the first joint portions 500-1, 500-2, and 500-3, the second joint portions 600-1, 600-2, and 600-3, and the fourth joint portions 700-1, 700-2, and 700-3. In an embodiment, the first joint portions 500-1, 500-2, and 500-3, the second joint portions 600-1, 600-2, and 600-3, and the fourth joint portions 700-1, 700-2, and 700-3 each have the joint structure 2000.

According to the configuration as above, the end-effector 100 may be translated in the X, Y, and Z directions by adjusting the driving amounts of the three actuators 400-1, 400-2, and 400-3. The multi-DOF moving stage 1004a of an embodiment has a so-called tripteron parallel robot structure having 3 degrees of freedom. In the multi-DOF moving stage 1004a configured as above, mechanical interpretation and control are intuitive because the linear movements in the X, Y, and Z directions of the actuators 400-1, 400-2, and 400-3 have a one-to-one correspondence to degrees of freedom of the end-effector 100 in the X, Y, and Z directions. Accordingly, control is made easy. Furthermore, as most of the first, second, and fourth joint portions are passive rotary joint portions, application of an origami mechanism is easy, and the multi-DOF moving stage 1004a may be usefully applied to a display apparatus as an ultracompact, ultra-precise, and ultra-high speed 3-degree of freedom moving stage.

Figure 19:
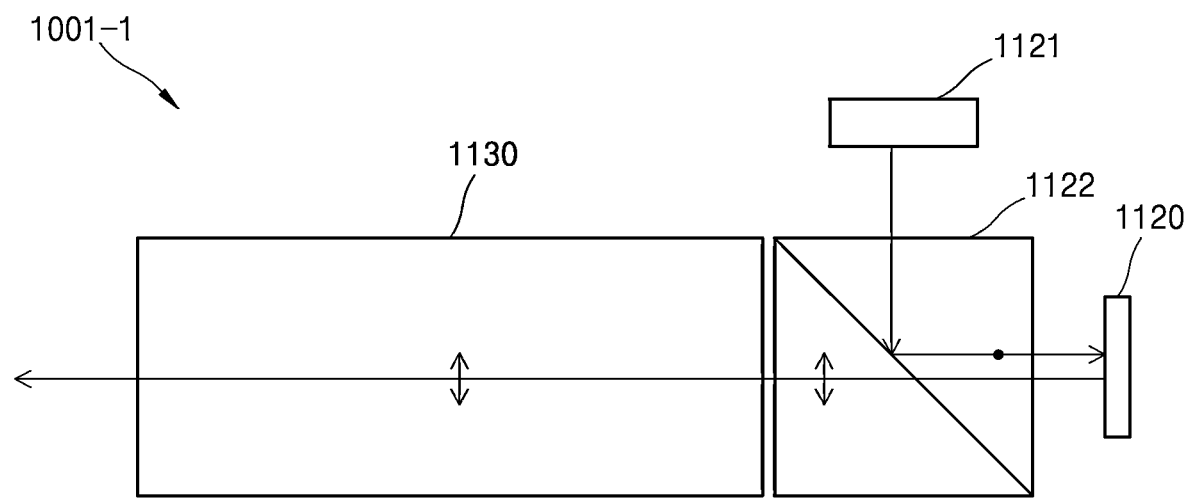
FIG. 19 is a schematic side view of an example configuration of a first light source.

FIG. 19 is a schematic side view of an example configuration of the first light source 1001-1. The example configuration of the first light source 1001-1 may also be applied to the second light source 1001-2. Referring to FIG. 19, the first light source 1001-1 may include a light source 1121, a display panel 1120 for generating light including image information by reflecting light from the light source 1121, a beam splitter 1122 provided between the light source 1121 and the display panel 1120, and reflecting the light from the light source 1121 toward the display panel 1120 and transmitting light from the display panel 1120, and a projection optical system 1130 for projecting the light from the display panel 1120.

The light source 1121 may include a light-emitting diode (LED) device for emitting white light. However, the disclosure is not limited thereto, and the light source 1121 may include a laser diode for emitting laser light. In this case, the light emitted from the light source 1121 may have coherence. The light source 1121 emits monochromatic light in a visible light range. For example, the light source 1121 may include an optical device, for example, an LED, emitting any one of red light, green light, and blue light. Furthermore, the light source 1121 may include a plurality of optical elements including a first optical element for emitting red light, a second optical element for emitting green light, and a third optical element for emitting blue light. The first, second, and third optical elements included in the light source 1121 and emitting light of different wavelengths may be independently driven with a time gap (e.g., sequentially or non-simultaneously). Accordingly, the red light, green light, and blue light may be sequentially emitted from the light source 1121.

The display panel 1120 may convert the light emitted from the light source 1121 into light including image information. For example, the display panel 1120 may include any one of a liquid crystal on silicon (LCoS), a digital micromirror display (DMD), and a liquid crystal display (LCD) panel. For example, when the display panel 1120 is an LCoS or LCD, the light including image information generated by the display panel 1120 may be light of a first polarization. For example, the first polarization may be a horizontal polarization (P-polarization). However, the disclosure is not limited thereto, and the first polarization may be a vertical polarization (S-polarization). For example, when the display panel 1120 is a DMD, the first light source 1001-1 may further include a separate polarized panel for converting the polarization of the light reflected from the display panel 1120.

The beam splitter 1122 may be provided when the display panel 1120 is of a reflection type. For example, when the display panel 1120 is an LCoS or DMD, the beam splitter 1122 may be provided between the light source 1121 and the display panel 1120. The beam splitter 1122 may include a polarization beam splitter (PBS) for transmitting or reflecting light according to the type of polarization. The beam splitter 1122 may include an incident surface inclined at a certain angle with respect to a traveling path of the light emitted from the light source 1121. At least part of the light from the light source 1121 is reflected by the incident surface and may travel toward the display panel 1120. In this state, the light reflected by the incident surface of the beam splitter 1122 and travelling toward the display panel 1120 may be, for example, light of a vertical polarization (S-polarization). For example, when the display panel 1120 is LCoS, the light of a vertical polarization (S-polarization) travelling toward the display panel 1120 may be reflected by the display panel 1120 and converted into light of a horizontal polarization (P-polarization). Furthermore, when the display panel 1120 is a DMD, a separate polarized panel for converting the incident light into light of a horizontal polarization (P-polarization) may be provided between the beam splitter 1122 and the display panel 1120. The light of a horizontal polarization (P-polarization) from the display panel 1120 may pass through the beam splitter 1122.

Unlike the illustration of FIG. 19, when the display panel 1120 is of a transmitting type, the beam splitter 1122 may not be included in the first light source 1001-1. In this case, the light source 1121, the display panel 1120, and the projection optical system 1130 may be provided in a line.

The display panel 1120 may form an image. The image formed by the display panel 1120 may be magnified through the projection optical system 1130. The projection optical system 1130 may include a plurality of lenses. The image formed by the display panel 1120 may be magnified through the lenses included in the projection optical system 1130 and formed inside the display apparatus 1000.

Figure 20:
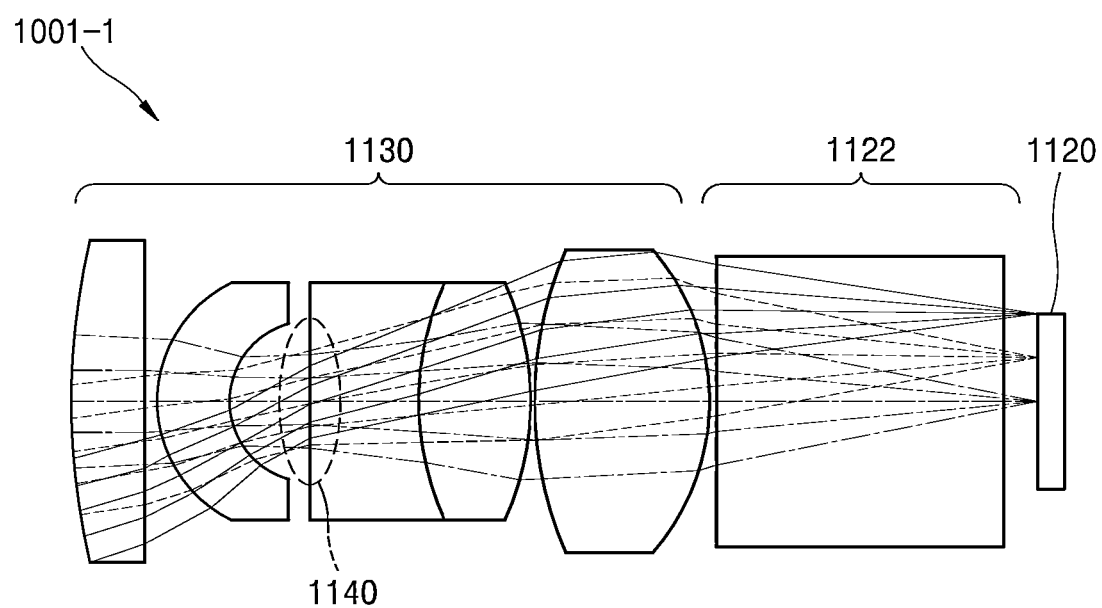
FIG. 20 is a schematic side view showing the example configuration of the first light source.

FIG. 20 is a schematic side view showing an example configuration of the first light source 1001-1 of FIG. 19. In FIG. 20, for convenience of explanation, the light source 1121 of FIG. 19 is omitted. Referring to FIG. 20, the light from the display panel 1120 may pass through the beam splitter 1122 and the projection optical system 1130. For example, the projection optical system 1130 may include a lens group including a plurality of lenses. For example, the lens group included in the projection optical system 1130 may include a projector lens group for forming an image inside the display apparatus 1000. To diffuse the light from the display panel 1120, the shapes of the lenses may be appropriately designed. Accordingly, the image by the light from the display panel 1120 may be magnified. Furthermore, an aperture 1140 may be provided between the lenses. The aperture 1140 may shield part of the light emitted from the display panel 1120.

The structures of the first and second light sources 1001-1 and 1001-2 are not limited to the examples shown in FIGS. 19 and 20. The first and second light sources 1001-1 and 1001-2 may have various optical structures capable of providing image light.

By employing a joint structure adopting a castellated pattern, it is possible to implement a multi-DOF moving stage capable of precise position adjustment, and a display apparatus using the multi-DOF moving stage. Furthermore, by employing a joint structure adopting a castellated pattern, it is possible to implement a multi-DOF moving stage with improved rigidity, and a display apparatus using the multi-DOF moving stage. By employing a linkage-joint integrated joint structure, it is possible to implement a multi-DOF moving stage capable of precisely adjusting the position of a light source at a high speed, and a display apparatus using the multi-DOF moving stage.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and their equivalents.

What is claimed is:

1. A multi-degree of freedom (DOF) moving stage comprising:
   an end-effector;
   a plurality of driving links;
   a plurality of actuators configured to drive the plurality of driving links; and
   a plurality of driven links each including a first joint portion connected to the end-effector and a second joint portion connected to a respective one of the plurality of driving links,
   wherein for each of the plurality of driven links, at least one of the first joint portion and the second joint portion comprises a joint structure comprising a first flexible member, a first rigid member, and a second rigid member,
   wherein the first rigid member and the second rigid member are arranged apart from each other such that a first gap between the first rigid member and the second rigid member exposes a first surface of the first flexible member, and
   wherein castellated patterns having shapes complementary to each other are respectively provided at a first end portion of the first rigid member adjacent to the first gap and a second end portion of the second rigid member adjacent to the first gap.

2. The multi-DOF moving stage of claim 1, wherein the joint structure comprises a third rigid member and a fourth rigid member arranged apart from each other with a second gap therebetween such that the second gap exposes a second surface of the first flexible member, the third rigid member and the fourth rigid member respectively facing the first rigid member and the second rigid member.

3. The multi-DOF moving stage of claim 2, wherein castellated patterns having shapes complementary to each other are respectively provided at a third end portion of the third rigid member adjacent to the second gap and a fourth end portion of the fourth rigid member adjacent to the second gap.

4. The multi-DOF moving stage of claim 1, wherein the joint structure comprises:
- a second flexible member on the first rigid member and on the second rigid member; and
- a fifth rigid member and a sixth rigid member arranged apart from each other with a third gap therebetween such that the third gap exposes the second flexible member, the fifth rigid member and the sixth rigid member respectively facing the first rigid member and the second rigid member, the third gap being larger than the first gap,
- wherein a first recess portion is provided in the first rigid member and a second recess portion is provided in the second rigid member to correspond to the third gap,
- wherein two or more rigid segment members are arranged at a position corresponding to the third gap and
- wherein at least one fourth gap is provided between adjacent rigid segment members of the two or more rigid segment members such that the at least one fourth gap exposes at least one surface of the second flexible member.

5. The multi-DOF moving stage of claim 4, wherein castellated patterns having shapes complementary to each other are provided at a fifth end portion and a sixth end portion of the fifth rigid member and the sixth rigid member, respectively, adjacent to the third gap and to end portions of the two or more rigid segment members.

6. The multi-DOF moving stage of claim 1, wherein the plurality of actuators drive the plurality of driving links to rotate.

7. The multi-DOF moving stage of claim 6, wherein each of the plurality of driven links comprises a first arm, a second arm, a third arm, and a fourth arm connected in a form of a parallelogram by a third joint portion, and
wherein the third joint portion comprises another of the joint structure.

8. The multi-DOF moving stage of claim 7, wherein at least one from among the first arm, the second arm, the third arm, and the fourth arm has a bent hollow prism shape.

9. The multi-DOF moving stage of claim 1, wherein the plurality of actuators drive the plurality of driving links to translate,
wherein the plurality of actuators are connected to the plurality of driving links via a fourth joint portion, and
wherein the fourth joint portion comprises another of the joint structure.

10. A display apparatus comprising:
a light source configured to provide image light;
a multi-degree of freedom (DOF) moving stage configured to adjust a position of the light source; and
an optical system configured to provide the image light to a pupil,
wherein the multi-DOF moving stage comprises:
an end-effector on which the light source is mounted;
a plurality of driving links;
a plurality of actuators configured to drive the plurality of driving links; and
a plurality of driven links each including a first joint portion connected to the end-effector and a second joint portion connected to a respective one of the plurality of driving links,
wherein for each of the plurality of driven links, at least one of the first joint portion and the second joint portion comprises a joint structure comprising a first flexible member, a first rigid member, and a second rigid member,
wherein the first rigid member and the second rigid member are arranged apart from each other such that a first gap between the first rigid member and the second rigid member exposes a first surface of the first flexible member, and
wherein castellated patterns having shapes complementary to each other are respectively provided at a first end portion of the first rigid member adjacent to the first gap and a second end portion of the second rigid member adjacent to the first gap.

11. The display apparatus of claim 10, wherein the joint structure comprises a third rigid member and a fourth rigid member arranged apart from each other with a second gap therebetween such that the second gap exposes a second surface of the first flexible member, the third rigid member and the fourth rigid member respectively facing the first rigid member and the second rigid member.

12. The display apparatus of claim 11, wherein castellated patterns having shapes complementary to each other are respectively provided at a third end portion of the third rigid member adjacent to the second gap and a fourth end portion of the fourth rigid member adjacent to the second gap.

13. The display apparatus of claim 10, wherein the joint structure comprises:
- a second flexible member on the first rigid member and on the second rigid member; and
- a fifth rigid member and a sixth rigid member arranged apart from each other with a third gap therebetween such that the third gap exposes the second flexible member, the fifth rigid member and the sixth rigid member respectively facing the first rigid member and the second rigid member, the third gap being larger than the first gap,
- wherein a first recess portion is provided in the first rigid member and a second recess portion is provided in the second rigid member to correspond to the third gap,
- wherein two or more rigid segment members are arranged at a position corresponding to the third gap, and
- wherein at least one fourth gap is provided between adjacent rigid segment members of the two or more rigid segment members such that the at least one fourth gap exposes at least one surface of the second flexible member.

14. The display apparatus of claim 13, wherein castellated patterns having shapes complementary to each other are provided at a fifth end portion and a sixth end portion of the fifth rigid member and the sixth rigid member, respectively, adjacent to the third gap and to end portions of the two or more rigid segment members.

15. The display apparatus of claim 10, wherein the plurality of actuators drive the plurality of driving links to rotate.

16. The display apparatus of claim 15, wherein each of the plurality of driven links comprises a first arm, a second arm, a third arm, and a fourth arm connected in a form of a parallelogram by a third joint portion, and
wherein the third joint portion comprises another of the joint structure.

17. The display apparatus of claim 16, wherein at least one from among the first arm, the second arm, the third arm, and the fourth arm has a bent hollow prism shape.

18. The display apparatus of claim 10, wherein the plurality of actuators drive the plurality of driving links to translate,
 wherein the plurality of actuators are connected to the plurality of driving links via a fourth joint portion, and
 wherein the fourth joint portion comprises another of the joint structure.

19. The display apparatus of claim 10, wherein the plurality of driving links comprise three driving links,
 wherein the plurality of driven links comprise three driven links, and
 wherein the plurality of actuators comprise three actuators.

20. The display apparatus of claim 10, wherein the light source comprises a first light source and a second light source configured to provide a left-eye image and a right-eye image, respectively, and
 wherein the multi-DOF moving stage comprises a first multi-DOF moving stage and a second multi-DOF moving stage corresponding to the first light source and the second light source, respectively.

\* \* \* \* \*